(12) United States Patent
Daggett et al.

(10) Patent No.: US 11,674,435 B2
(45) Date of Patent: Jun. 13, 2023

(54) LEVERED COUNTERWEIGHT FEATHERING SYSTEM

(71) Applicant: General Electric Company, Schenectady, NY (US)

(72) Inventors: Nicholas M. Daggett, Cincinnati, OH (US); Gert Johannes van der Merwe, Lebanon, OH (US); Daniel Alan Niergarth, Norwood, OH (US); Brian Lewis Devendorf, Georgetown, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/361,804

(22) Filed: Jun. 29, 2021

(65) Prior Publication Data

US 2022/0412254 A1    Dec. 29, 2022

(51) Int. Cl.
*F02C 3/06* (2006.01)
*F02C 9/58* (2006.01)
*F02K 3/06* (2006.01)

(52) U.S. Cl.
CPC .................. *F02C 3/06* (2013.01); *F02C 9/58* (2013.01); *F02K 3/06* (2013.01); *F05D 2220/32* (2013.01); *F05D 2220/36* (2013.01)

(58) Field of Classification Search
CPC ...... F02C 3/06; F02C 9/58; F02K 3/06; F05D 2220/32; F05D 2220/36
See application file for complete search history.

(56) References Cited

U.S. PATENT DOCUMENTS

| 493,623 A | 3/1893 | Harris |
|---|---|---|
| 1,951,321 A | 3/1934 | Blanchard |
| 2,177,315 A | 10/1939 | Caria |
| 2,353,334 A | 7/1944 | Haugh |

(Continued)

FOREIGN PATENT DOCUMENTS

| CA | 2241940 A1 | 7/1997 |
|---|---|---|
| CA | 2414992 A1 | 9/2003 |

(Continued)

OTHER PUBLICATIONS

Nishikawa et al., Technical Trend of Aircraft Bearings, NTN Technical Review, No. 82, Oct. 2014, pp. 083-087.

(Continued)

*Primary Examiner* — Steven M Sutherland
(74) *Attorney, Agent, or Firm* — Dority & Manning, P.A.

(57) ABSTRACT

A fan assembly for a gas turbine engine includes a fan disk, a trunnion, an actuation device, a fan blade, and a counterweight assembly. The trunnion is mounted to the fan disk. The actuation device is operably coupled to the trunnion. The fan blade is rotatably attached to the fan disk. The counterweight assembly includes a link arm, a lever arm, a hinge, and a counterweight. The link arm is connected to the trunnion, to the actuation device, or to both. The link arm is configured to drive rotation of the trunnion relative to the fan disk. The hinge is pivotably connected to the lever arm. The lever arm is connected to the link arm and is disposed to rotate about a connection point of the lever arm and the hinge. The counterweight is mounted to the lever arm at a location spaced from the hinge.

18 Claims, 6 Drawing Sheets

(56) References Cited

U.S. PATENT DOCUMENTS

| | | | |
|---|---|---|---|
| 2,417,406 A | 3/1947 | Burkhalter | |
| 2,419,787 A | 4/1947 | Muffly | |
| 2,518,431 A | 8/1950 | Wildhaber | |
| 2,566,696 A | 9/1951 | Cushman | |
| 2,594,160 A | 4/1952 | Hansson | |
| 2,648,391 A | 8/1953 | Cushman et al. | |
| 2,665,055 A | 1/1954 | Adams, Jr. | |
| 2,955,656 A | 10/1960 | Balje et al. | |
| 3,559,725 A | 2/1971 | Fucinari | |
| 3,560,110 A | 2/1971 | Cornell | |
| 3,687,569 A | 8/1972 | Klompas | |
| 3,781,131 A | 12/1973 | McMurtry | |
| 3,893,789 A | 7/1975 | Andrews | |
| 3,922,852 A | 12/1975 | Drabek | |
| 3,988,889 A | 11/1976 | Chamay et al. | |
| 3,994,128 A | 11/1976 | Griswold, Jr. et al. | |
| 4,141,664 A | 2/1979 | Moran et al. | |
| 4,411,596 A | 10/1983 | Chilman | |
| 4,578,019 A | 3/1986 | Safarik | |
| 4,671,737 A | 6/1987 | Whitehouse | |
| 4,704,862 A | 11/1987 | Dennison et al. | |
| 4,887,424 A | 12/1989 | Geidel et al. | |
| 4,913,623 A | 4/1990 | Schilling et al. | |
| 4,936,748 A | 6/1990 | Adamson et al. | |
| 4,969,325 A | 11/1990 | Adamson et al. | |
| 4,976,102 A | 12/1990 | Taylor | |
| 5,010,729 A | 4/1991 | Adamson et al. | |
| 5,015,150 A | 5/1991 | Rohra | |
| 5,028,207 A | 7/1991 | Rohra et al. | |
| 5,100,158 A | 3/1992 | Gardner | |
| 5,199,850 A | 4/1993 | Carvalho et al. | |
| 5,257,907 A | 11/1993 | Seidel | |
| 5,263,898 A | 11/1993 | Elston, III et al. | |
| 5,282,719 A * | 2/1994 | McCarty | B64C 11/44 416/165 |
| 5,284,418 A | 2/1994 | Moriya | |
| 5,370,402 A | 12/1994 | Gardner et al. | |
| 5,427,455 A | 6/1995 | Bosley | |
| 5,431,539 A | 7/1995 | Carvalho | |
| 5,501,575 A | 3/1996 | Eldredge et al. | |
| 5,529,263 A | 6/1996 | Rudolph | |
| 5,542,357 A | 8/1996 | Gerhardt | |
| 5,562,417 A | 10/1996 | Grimm et al. | |
| 5,584,586 A | 12/1996 | Casarcia et al. | |
| 5,617,719 A | 4/1997 | Ginter | |
| 5,630,701 A | 5/1997 | Lawer | |
| 5,632,493 A | 5/1997 | Gardner | |
| 5,727,757 A | 3/1998 | Nyhus | |
| 5,743,080 A | 4/1998 | Ginter | |
| 5,779,446 A | 7/1998 | Althof et al. | |
| 5,810,555 A | 9/1998 | Savage et al. | |
| 5,897,293 A | 4/1999 | Arel et al. | |
| 5,904,320 A | 5/1999 | Tindell | |
| 5,931,636 A | 8/1999 | Savage | |
| 5,967,461 A | 10/1999 | Farrington | |
| 5,974,882 A | 11/1999 | Heath | |
| 5,977,677 A | 11/1999 | Henry et al. | |
| 5,988,307 A | 11/1999 | Yamada et al. | |
| 6,000,635 A | 12/1999 | Justice | |
| 6,027,383 A | 2/2000 | Broinowski | |
| 6,071,077 A | 6/2000 | Rowlands | |
| 6,112,512 A | 9/2000 | Miller et al. | |
| 6,112,513 A | 9/2000 | Catt et al. | |
| 6,112,523 A | 9/2000 | Kamo et al. | |
| 6,148,605 A | 11/2000 | Lardellier | |
| 6,158,894 A | 12/2000 | Pujari et al. | |
| 6,173,908 B1 | 1/2001 | Bureaux et al. | |
| 6,195,981 B1 | 3/2001 | Hanley et al. | |
| 6,226,974 B1 | 5/2001 | Andrew et al. | |
| 6,247,311 B1 | 6/2001 | Itoyama et al. | |
| 6,260,794 B1 | 7/2001 | Rowe | |
| 6,270,309 B1 | 8/2001 | Ghetzler et al. | |
| 6,276,127 B1 | 8/2001 | Alberti | |
| 6,289,666 B1 | 9/2001 | Ginter | |
| 6,292,763 B1 | 9/2001 | Dunbar et al. | |
| 6,308,740 B1 | 10/2001 | Smith et al. | |
| 6,314,721 B1 | 11/2001 | Mathews et al. | |
| 6,324,828 B1 | 12/2001 | Willis et al. | |
| 6,332,313 B1 | 12/2001 | Willis et al. | |
| 6,332,754 B1 | 12/2001 | Matsuda et al. | |
| 6,349,682 B1 | 2/2002 | Alexius | |
| 6,386,830 B1 | 5/2002 | Slipper et al. | |
| 6,416,015 B1 | 7/2002 | Carson | |
| 6,431,146 B1 | 8/2002 | Alexius et al. | |
| 6,439,840 B1 | 8/2002 | Tse | |
| 6,450,369 B1 | 9/2002 | Heyes | |
| 6,464,459 B2 | 10/2002 | Illingworth | |
| 6,499,286 B1 | 12/2002 | Zakharov et al. | |
| 6,505,837 B1 | 1/2003 | Heshmat | |
| 6,516,603 B1 | 2/2003 | Urbach et al. | |
| 6,520,286 B1 | 2/2003 | Frederiksen et al. | |
| 6,543,998 B1 | 4/2003 | Scharl | |
| 6,557,503 B2 | 5/2003 | Hampson | |
| 6,557,799 B1 | 5/2003 | Sternberger | |
| 6,564,556 B2 | 5/2003 | Ginter | |
| 6,565,334 B1 | 5/2003 | Bradbury et al. | |
| 6,584,849 B2 | 7/2003 | Loftus et al. | |
| 6,619,030 B1 | 9/2003 | Seda et al. | |
| 6,647,708 B2 | 11/2003 | Bornhoft et al. | |
| 6,651,439 B2 | 11/2003 | Al-Roub et al. | |
| 6,681,557 B2 | 1/2004 | Wilson | |
| 6,687,596 B2 | 2/2004 | Humerickhouse et al. | |
| 6,691,515 B2 | 2/2004 | Verdouw et al. | |
| 6,708,905 B2 | 3/2004 | Mccoy et al. | |
| 6,722,847 B2 | 4/2004 | Freeman et al. | |
| 6,732,502 B2 | 5/2004 | Seda et al. | |
| 6,749,395 B1 | 6/2004 | Reichert et al. | |
| 6,802,185 B2 | 10/2004 | Furukawa et al. | |
| 6,802,695 B2 | 10/2004 | Haller | |
| 6,811,154 B2 | 11/2004 | Proctor et al. | |
| 6,820,431 B2 | 11/2004 | McManus et al. | |
| 6,866,610 B2 | 3/2005 | Ito | |
| 6,885,129 B1 | 4/2005 | Oohashi et al. | |
| 6,885,917 B2 | 4/2005 | Osder et al. | |
| 6,901,738 B2 | 6/2005 | Sammann et al. | |
| 6,942,453 B2 | 9/2005 | Tsuru et al. | |
| 6,942,458 B2 | 9/2005 | McCallum et al. | |
| 6,962,044 B1 | 11/2005 | Miller et al. | |
| 6,964,170 B2 | 11/2005 | Alkabie | |
| 6,969,235 B2 | 11/2005 | Feest | |
| 7,007,483 B2 | 3/2006 | Peters | |
| 7,043,900 B2 | 5/2006 | Shirakawa et al. | |
| 7,047,727 B2 | 5/2006 | Nordeen et al. | |
| 7,048,206 B2 | 5/2006 | Walti et al. | |
| 7,055,329 B2 | 6/2006 | Martens et al. | |
| 7,083,773 B2 | 8/2006 | Kwon et al. | |
| 7,100,360 B2 | 9/2006 | Sammann et al. | |
| 7,100,868 B2 | 9/2006 | Stephan | |
| RE39,479 E | 1/2007 | Tressler et al. | |
| 7,189,059 B2 | 3/2007 | Barton et al. | |
| 7,204,676 B2 | 4/2007 | Dutton et al. | |
| 7,252,478 B2 | 8/2007 | Aynsley | |
| 7,254,951 B2 | 8/2007 | Lockwood et al. | |
| 7,278,256 B2 | 10/2007 | Norris et al. | |
| 7,293,401 B2 | 11/2007 | Papamoschou | |
| 7,306,434 B2 | 12/2007 | Goldfinch et al. | |
| 7,308,966 B2 | 12/2007 | Gupta | |
| 7,310,951 B2 | 12/2007 | Kasahara | |
| 7,318,619 B2 | 1/2008 | Munro et al. | |
| 7,320,748 B2 | 1/2008 | Hemighaus et al. | |
| 7,334,392 B2 | 2/2008 | Moniz et al. | |
| 7,341,225 B2 | 3/2008 | Stretton et al. | |
| 7,395,188 B1 | 7/2008 | Goebel | |
| 7,399,377 B2 | 7/2008 | Crane et al. | |
| 7,406,826 B2 | 8/2008 | Hayashi et al. | |
| 7,424,413 B2 | 9/2008 | Brooke et al. | |
| 7,437,877 B2 | 10/2008 | Kawamoto et al. | |
| 7,451,592 B2 | 11/2008 | Taylor et al. | |
| 7,472,543 B2 | 1/2009 | Papamoschou | |
| 7,503,750 B1 | 3/2009 | Violette | |
| 7,510,371 B2 | 3/2009 | Orlando et al. | |
| 7,513,102 B2 | 4/2009 | Moniz et al. | |
| 7,520,124 B2 | 4/2009 | Narayanan et al. | |
| 7,543,452 B2 | 6/2009 | Reba et al. | |

(56) References Cited

U.S. PATENT DOCUMENTS

| | | |
|---|---|---|
| 7,549,293 B2 | 6/2009 | Gallagher et al. |
| 7,559,749 B2 | 7/2009 | Kidikian et al. |
| 7,568,890 B2 | 8/2009 | Findlay et al. |
| 7,591,130 B2 | 9/2009 | Ito |
| 7,600,368 B2 | 10/2009 | Lockwood et al. |
| 7,600,371 B2 | 10/2009 | Sternberger |
| 7,608,181 B2 | 10/2009 | O'Reer |
| 7,614,792 B2 | 11/2009 | Wade et al. |
| 7,622,817 B2 | 11/2009 | El-Refai et al. |
| 7,624,565 B2 | 12/2009 | Murrow |
| 7,624,567 B2 | 12/2009 | Peters et al. |
| 7,625,128 B2 | 12/2009 | Gillespie |
| 7,625,183 B2 | 12/2009 | Tsfourdaris et al. |
| 7,631,484 B2 | 12/2009 | Giffin et al. |
| 7,637,716 B2 | 12/2009 | Benton |
| 7,681,398 B2 | 3/2010 | Patel et al. |
| 7,726,113 B2 | 6/2010 | Orlando et al. |
| 7,726,660 B2 | 6/2010 | Datta |
| 7,735,601 B1 | 6/2010 | Stieger et al. |
| 7,753,036 B2 | 7/2010 | Lents et al. |
| 7,788,898 B2 | 9/2010 | Kern et al. |
| 7,791,235 B2 | 9/2010 | Kern et al. |
| 7,801,669 B2 | 9/2010 | Nagae |
| 7,806,651 B2 | 10/2010 | Kennepohl et al. |
| 7,818,970 B2 | 10/2010 | Price et al. |
| 7,840,301 B2 | 11/2010 | Staroselsky et al. |
| 7,861,580 B2 | 1/2011 | Sujan et al. |
| 7,861,967 B2 | 1/2011 | Karem |
| 7,863,767 B2 | 1/2011 | Chapple et al. |
| 7,877,980 B2 | 2/2011 | Johnson |
| 7,878,130 B2 | 2/2011 | Yamamto et al. |
| 7,901,657 B2 | 3/2011 | Arpac et al. |
| 7,918,090 B2 | 4/2011 | Suzuki et al. |
| 7,918,608 B2 | 4/2011 | Braun |
| 7,918,646 B2 | 4/2011 | Akcasu |
| 7,934,368 B2 | 5/2011 | Muller et al. |
| 7,963,364 B2 | 6/2011 | Nadler et al. |
| 7,967,924 B2 | 6/2011 | Groh et al. |
| 7,980,810 B2 | 7/2011 | Unno |
| 7,984,607 B2 | 7/2011 | Sharma et al. |
| 8,014,929 B2 | 9/2011 | Page et al. |
| 8,051,830 B2 | 11/2011 | Taylor |
| 8,055,435 B2 | 11/2011 | Okumura et al. |
| 8,057,187 B2 | 11/2011 | Demania |
| 8,065,874 B2 | 11/2011 | Fong et al. |
| 8,074,440 B2 | 12/2011 | Kohlenberg et al. |
| 8,074,924 B2 | 12/2011 | Cros |
| 8,075,270 B2 | 12/2011 | Violette et al. |
| 8,075,272 B2 | 12/2011 | Riaz |
| 8,087,251 B2 | 1/2012 | Iwasaki |
| 8,087,870 B2 | 1/2012 | Flucker et al. |
| 8,089,173 B2 | 1/2012 | Freda |
| 8,092,150 B2 | 1/2012 | Rofka et al. |
| 8,096,123 B2 | 1/2012 | Liu et al. |
| 8,096,775 B2 | 1/2012 | Riaz et al. |
| 8,100,657 B2 | 1/2012 | Riaz et al. |
| 8,100,665 B2 | 1/2012 | De Filippis et al. |
| 8,100,671 B2 | 1/2012 | Botros et al. |
| 8,104,972 B2 | 1/2012 | Maguire |
| 8,122,724 B2 | 2/2012 | Slovisky et al. |
| RE43,252 E | 3/2012 | Ginter |
| 8,127,528 B2 | 3/2012 | Roberge |
| 8,133,027 B2 | 3/2012 | Carvalho et al. |
| 8,205,827 B2 | 6/2012 | Kerrebrock et al. |
| 8,210,796 B2 | 7/2012 | Hernandez et al. |
| 8,220,443 B2 | 7/2012 | Murata et al. |
| 8,225,593 B2 | 7/2012 | Le Hong et al. |
| 8,261,527 B1 | 9/2012 | Stearns et al. |
| 8,262,358 B1 | 9/2012 | Muylaert et al. |
| 8,276,360 B2 | 10/2012 | Poisson et al. |
| 8,277,174 B2 | 10/2012 | Hasel et al. |
| 8,286,414 B2 | 10/2012 | Gallagher et al. |
| 8,302,397 B2 | 11/2012 | Liu et al. |
| 8,308,423 B2 | 11/2012 | Berryann et al. |
| 8,308,426 B2 | 11/2012 | Cigal et al. |
| 8,316,646 B2 | 11/2012 | Baran |
| 8,337,149 B1 | 12/2012 | Hasel et al. |
| 8,365,513 B2 | 2/2013 | McVey |
| 8,365,515 B2 | 2/2013 | Migliaro |
| 8,366,382 B1 | 2/2013 | Muldoon et al. |
| 8,366,385 B2 | 2/2013 | Davis et al. |
| 8,376,696 B2 | 2/2013 | Suzuki et al. |
| 8,382,430 B2 | 2/2013 | Parry et al. |
| 8,387,570 B2 | 3/2013 | Firey |
| 8,413,418 B2 | 4/2013 | Mason et al. |
| 8,418,436 B2 | 4/2013 | Pero et al. |
| 8,418,953 B2 | 4/2013 | Smith et al. |
| 8,418,964 B2 | 4/2013 | Leblanc et al. |
| 8,424,313 B1 | 4/2013 | Praisner et al. |
| 8,439,367 B2 | 5/2013 | Dibenedetto et al. |
| 8,443,582 B1 | 5/2013 | Phillips et al. |
| 8,443,586 B2 | 5/2013 | Schwark et al. |
| 8,448,451 B2 | 5/2013 | Nakamura et al. |
| 8,448,895 B2 | 5/2013 | Suciu et al. |
| 8,449,247 B1 | 5/2013 | Hasel et al. |
| 8,453,458 B2 | 6/2013 | Whurr et al. |
| 8,459,035 B2 | 6/2013 | Smith et al. |
| 8,460,779 B2 | 6/2013 | Gupta et al. |
| 8,468,797 B2 | 6/2013 | Sharma et al. |
| 8,499,626 B2 | 8/2013 | Greciet et al. |
| 8,511,061 B1 | 8/2013 | Merry et al. |
| 8,511,066 B2 | 8/2013 | Harris |
| 8,511,604 B2 | 8/2013 | Suciu et al. |
| 8,511,605 B2 | 8/2013 | Suciu et al. |
| 8,511,987 B2 | 8/2013 | Reinhardt et al. |
| 8,512,190 B2 | 8/2013 | De Maziere |
| 8,517,302 B2 | 8/2013 | Karem |
| 8,517,665 B2 | 8/2013 | Lugo et al. |
| 8,529,192 B2 | 9/2013 | Beers et al. |
| 8,539,749 B1 | 9/2013 | Wichmann et al. |
| 8,544,793 B1 | 10/2013 | Shammoh |
| 8,561,414 B1 | 10/2013 | Praisner et al. |
| 8,561,581 B2 | 10/2013 | Taylor |
| 8,562,284 B2 | 10/2013 | Bradbrook |
| 8,567,192 B2 | 10/2013 | Chi et al. |
| 8,572,943 B1 | 11/2013 | Sheridan |
| 8,579,225 B2 | 11/2013 | Mardjono et al. |
| 8,601,786 B2 | 12/2013 | Hurwitz et al. |
| 8,606,543 B2 | 12/2013 | Naslund et al. |
| 8,622,687 B2 | 1/2014 | Giffin et al. |
| 8,622,697 B2 | 1/2014 | Bortoli et al. |
| 8,632,301 B2 | 1/2014 | Topol et al. |
| 8,640,457 B2 | 2/2014 | Gokhale et al. |
| 8,646,251 B2 | 2/2014 | Rosenkrans et al. |
| 8,646,721 B2 | 2/2014 | Chapman et al. |
| 8,662,052 B2 | 3/2014 | Garside |
| 8,668,434 B2 | 3/2014 | Karpman et al. |
| 8,668,463 B2 | 3/2014 | Yilmaz |
| 8,678,743 B1 | 3/2014 | Sheridan et al. |
| 8,684,303 B2 | 4/2014 | Suciu et al. |
| 8,687,206 B2 | 4/2014 | Hockaday |
| 8,695,324 B2 | 4/2014 | Griffin et al. |
| 8,695,920 B2 | 4/2014 | Suciu et al. |
| 8,702,381 B2 | 4/2014 | Alajbegovic et al. |
| 8,708,256 B2 | 4/2014 | Kobayashi |
| 8,708,640 B2 | 4/2014 | Power et al. |
| 8,708,643 B2 | 4/2014 | Griffin et al. |
| 8,708,863 B2 | 4/2014 | McCune et al. |
| 8,713,910 B2 | 5/2014 | Stuart et al. |
| 8,714,913 B2 | 5/2014 | Topol et al. |
| 8,727,267 B2 | 5/2014 | Jain et al. |
| 8,734,095 B2 | 5/2014 | Iida |
| 8,747,054 B2 | 6/2014 | Witlicki |
| 8,753,065 B2 | 6/2014 | Sheridan et al. |
| 8,769,962 B2 | 7/2014 | Glahn et al. |
| 8,777,793 B2 | 7/2014 | Sheridan |
| 8,793,971 B2 | 8/2014 | Dyer et al. |
| 8,794,009 B2 | 8/2014 | Glahn et al. |
| 8,794,542 B1 | 8/2014 | Hunter et al. |
| 8,794,846 B2 | 8/2014 | Hashish |
| 8,794,910 B2 | 8/2014 | Gasmen et al. |
| 8,800,261 B2 | 8/2014 | Hall et al. |
| 8,800,914 B2 | 8/2014 | Suciu et al. |
| 8,806,850 B2 | 8/2014 | Winter et al. |

(56) References Cited

U.S. PATENT DOCUMENTS

| | | |
|---|---|---|
| 8,807,477 B2 | 8/2014 | Suciu et al. |
| 8,807,916 B2 | 8/2014 | Sheridan et al. |
| 8,807,921 B2 | 8/2014 | Struziak |
| 8,814,494 B1 | 8/2014 | Sheridan et al. |
| 8,814,502 B2 | 8/2014 | Eleftheriou |
| 8,814,510 B2 | 8/2014 | Colson et al. |
| 8,820,090 B2 | 9/2014 | Lee et al. |
| 8,820,091 B2 | 9/2014 | Tham et al. |
| 8,827,203 B2 | 9/2014 | Balk |
| 8,827,639 B2 | 9/2014 | Beers et al. |
| 8,833,086 B2 | 9/2014 | Parnin et al. |
| 8,834,028 B2 | 9/2014 | Winkler et al. |
| 8,834,095 B2 | 9/2014 | Davis |
| 8,834,099 B1 | 9/2014 | Topol et al. |
| 8,839,627 B2 | 9/2014 | Eastwood et al. |
| 8,840,375 B2 | 9/2014 | Virkler |
| 8,844,257 B2 | 9/2014 | Parnin et al. |
| 8,844,265 B2 | 9/2014 | Adams et al. |
| 8,850,793 B2 | 10/2014 | Adams et al. |
| 8,851,419 B2 | 10/2014 | Cottet |
| 8,851,754 B2 | 10/2014 | Dettmar et al. |
| 8,857,149 B1 | 10/2014 | Muldoon |
| 8,857,193 B2 | 10/2014 | Thies |
| 8,858,388 B2 | 10/2014 | McCune et al. |
| 8,863,491 B2 | 10/2014 | Merry et al. |
| 8,863,529 B2 | 10/2014 | Starr |
| 8,864,062 B2 | 10/2014 | Karem |
| 8,869,504 B1 | 10/2014 | Schwarz et al. |
| 8,932,018 B2 | 1/2015 | Gallet |
| 9,090,336 B2 | 7/2015 | Gallet |
| 9,366,147 B2 | 6/2016 | Gallet |
| 9,797,407 B2 | 10/2017 | Burghardt |
| 9,869,190 B2 | 1/2018 | Niergarth et al. |
| 10,072,510 B2 | 9/2018 | Miller et al. |
| 10,094,278 B2 | 10/2018 | Sheridan et al. |
| 10,190,496 B2 | 1/2019 | Schwarz et al. |
| 10,221,706 B2 | 3/2019 | Niergarth et al. |
| 10,371,096 B2 | 8/2019 | Miller et al. |
| 10,494,084 B2 | 12/2019 | Garassino |
| 2002/0124991 A1 | 9/2002 | Wilson |
| 2002/0162394 A1 | 11/2002 | Loftus et al. |
| 2003/0163983 A1 | 9/2003 | Seda et al. |
| 2003/0163984 A1 | 9/2003 | Seda et al. |
| 2003/0215330 A1 | 11/2003 | Haller |
| 2004/0123583 A1 | 7/2004 | Nordeen et al. |
| 2004/0129392 A1 | 7/2004 | Crane et al. |
| 2004/0261396 A1 | 12/2004 | Sammann et al. |
| 2005/0000205 A1 | 1/2005 | Sammann et al. |
| 2005/0068232 A1 | 3/2005 | Smith et al. |
| 2005/0178105 A1 | 8/2005 | Kawamoto et al. |
| 2005/0241292 A1 | 11/2005 | Taylor et al. |
| 2005/0276693 A1 | 12/2005 | Liu |
| 2006/0024162 A1 | 2/2006 | Giffin |
| 2006/0090451 A1 | 5/2006 | Moniz et al. |
| 2006/0096293 A1 | 5/2006 | Norris et al. |
| 2006/0272314 A1 | 12/2006 | Moniz et al. |
| 2006/0275111 A1 | 12/2006 | Orlando et al. |
| 2007/0084186 A1 | 4/2007 | Orlando et al. |
| 2007/0130959 A1 | 6/2007 | Linet et al. |
| 2007/0157595 A1 | 7/2007 | Lockwood et al. |
| 2008/0014079 A1 | 1/2008 | Lockwood et al. |
| 2008/0022691 A1 | 1/2008 | Kennepohl et al. |
| 2008/0056894 A1 | 3/2008 | Tsifourdaris et al. |
| 2008/0089630 A1 | 4/2008 | Glueck |
| 2008/0098713 A1 | 5/2008 | Orlando et al. |
| 2008/0118360 A1 | 5/2008 | Findlay et al. |
| 2008/0124221 A1 | 5/2008 | Kidikian et al. |
| 2008/0138195 A1 | 6/2008 | Kem et al. |
| 2008/0140352 A1 | 6/2008 | Goebel et al. |
| 2008/0143108 A1 | 6/2008 | El-Refaie et al. |
| 2008/0149445 A1 | 6/2008 | Kern et al. |
| 2008/0155961 A1 | 7/2008 | Johnson |
| 2008/0273969 A1 | 11/2008 | Murrow et al. |
| 2008/0283676 A1 | 11/2008 | Jain et al. |
| 2008/0309019 A1 | 12/2008 | Wolfe et al. |
| 2009/0004008 A1 | 1/2009 | Richards |
| 2009/0016870 A1 | 1/2009 | Kodama et al. |
| 2009/0068003 A1 | 3/2009 | Sharma et al. |
| 2009/0112535 A1 | 4/2009 | Phillips |
| 2009/0133381 A1 | 5/2009 | Holmes et al. |
| 2009/0199536 A1 | 8/2009 | Bulin et al. |
| 2009/0211221 A1 | 8/2009 | Roberge |
| 2009/0257878 A1 | 10/2009 | Hernandez et al. |
| 2009/0314082 A1 | 12/2009 | Sujan et al. |
| 2010/0000222 A1 | 1/2010 | Price et al. |
| 2010/0019101 A1 | 1/2010 | Smith et al. |
| 2010/0034659 A1 | 2/2010 | Fujimura |
| 2010/0058769 A1 | 3/2010 | Baran |
| 2010/0061856 A1 | 3/2010 | Demania |
| 2010/0061860 A1 | 3/2010 | Riaz et al. |
| 2010/0061861 A1 | 3/2010 | Riaz et al. |
| 2010/0089019 A1 | 4/2010 | Knight et al. |
| 2010/0092295 A1 | 4/2010 | Riaz et al. |
| 2010/0143101 A1 | 6/2010 | Fang et al. |
| 2010/0154761 A1 | 6/2010 | Okumura et al. |
| 2010/0192595 A1 | 8/2010 | Orlando et al. |
| 2010/0193644 A1 | 8/2010 | Karem |
| 2010/0280730 A1 | 11/2010 | Page et al. |
| 2010/0300087 A1 | 12/2010 | Liu et al. |
| 2010/0305011 A1 | 12/2010 | Frapin et al. |
| 2010/0326753 A1 | 12/2010 | Garside |
| 2011/0004388 A1 | 1/2011 | Winter |
| 2011/0036086 A1 | 2/2011 | Liu et al. |
| 2011/0036955 A1 | 2/2011 | Karem |
| 2011/0052370 A1 | 3/2011 | Karpman et al. |
| 2011/0061381 A1 | 3/2011 | Harris et al. |
| 2011/0076158 A1 | 3/2011 | Giffin et al. |
| 2011/0083641 A1 | 4/2011 | Gokhale et al. |
| 2011/0092726 A1 | 4/2011 | Clarke |
| 2011/0118071 A1 | 5/2011 | DeMaziere |
| 2011/0120082 A1 | 5/2011 | Griffin et al. |
| 2011/0167784 A1 | 7/2011 | Johnson et al. |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0171007 A1 | 7/2011 | Johnson et al. |
| 2011/0189003 A1 | 8/2011 | Iida |
| 2011/0243719 A1 | 10/2011 | Murphy et al. |
| 2011/0247343 A1 | 10/2011 | Sharma et al. |
| 2011/0268578 A1 | 11/2011 | Praisner et al. |
| 2011/0277448 A1 | 11/2011 | Roberts |
| 2011/0286842 A1 | 11/2011 | Danielson et al. |
| 2011/0288744 A1 | 11/2011 | Gokhale et al. |
| 2011/0290483 A1 | 12/2011 | Zornes |
| 2012/0011825 A1 | 1/2012 | Hall et al. |
| 2012/0036843 A1 | 2/2012 | Schertz et al. |
| 2012/0045334 A1 | 2/2012 | Bouru et al. |
| 2012/0056034 A1 | 3/2012 | Kosheleff |
| 2012/0073263 A1 | 3/2012 | Kohlenberg et al. |
| 2012/0085861 A1 | 4/2012 | Mardjono et al. |
| 2012/0087780 A1 | 4/2012 | Suciu et al. |
| 2012/0096853 A1 | 4/2012 | Taylor |
| 2012/0097801 A1 | 4/2012 | Barrett et al. |
| 2012/0110979 A1 | 5/2012 | Rosenkrans et al. |
| 2012/0117940 A1 | 5/2012 | Winter |
| 2012/0117975 A1 | 5/2012 | Sharma et al. |
| 2012/0121390 A1 | 5/2012 | Suciu et al. |
| 2012/0152007 A1 | 6/2012 | Holmes et al. |
| 2012/0171018 A1 | 7/2012 | Hasel et al. |
| 2012/0174593 A1 | 7/2012 | Sharma et al. |
| 2012/0198815 A1 | 8/2012 | Suciu et al. |
| 2012/0198816 A1 | 8/2012 | Suciu et al. |
| 2012/0198817 A1 | 8/2012 | Suciu et al. |
| 2012/0210710 A1 | 8/2012 | Chevalier et al. |
| 2012/0210711 A1 | 8/2012 | Petrovic et al. |
| 2012/0222397 A1 | 9/2012 | Smith et al. |
| 2012/0222398 A1 | 9/2012 | Smith et al. |
| 2012/0233981 A1 | 9/2012 | Smith et al. |
| 2012/0233982 A1 | 9/2012 | Suciu et al. |
| 2012/0237334 A1 | 9/2012 | Mccune et al. |
| 2012/0237336 A1 | 9/2012 | Mccune et al. |
| 2012/0238401 A1 | 9/2012 | Mccune et al. |
| 2012/0243971 A1 | 9/2012 | Mccune et al. |
| 2012/0251306 A1 | 10/2012 | Reinhardt et al. |

(56) References Cited

U.S. PATENT DOCUMENTS

| | | |
|---|---|---|
| 2012/0255292 A1 | 10/2012 | Fong et al. |
| 2012/0257960 A1 | 10/2012 | Reinhardt et al. |
| 2012/0275904 A1 | 11/2012 | Mccune et al. |
| 2012/0279198 A1 | 11/2012 | Erickson et al. |
| 2012/0291449 A1 | 11/2012 | Adams et al. |
| 2012/0292440 A1 | 11/2012 | Kosheleff |
| 2012/0315130 A1 | 12/2012 | Hasel et al. |
| 2012/0321476 A1 | 12/2012 | Mackie et al. |
| 2012/0328436 A1 | 12/2012 | Soidel et al. |
| 2013/0000314 A1 | 1/2013 | McCaffrey |
| 2013/0004297 A1 | 1/2013 | Sheridan |
| 2013/0008144 A1 | 1/2013 | Gallagher et al. |
| 2013/0008146 A1 | 1/2013 | Gallagher et al. |
| 2013/0011261 A1 | 1/2013 | Boston et al. |
| 2013/0014488 A1 | 1/2013 | Gallagher et al. |
| 2013/0014489 A1 | 1/2013 | Suciu et al. |
| 2013/0014490 A1 | 1/2013 | Suciu et al. |
| 2013/0028733 A1 | 1/2013 | McCune |
| 2013/0067917 A1 | 3/2013 | Nagurney et al. |
| 2013/0068200 A1 | 3/2013 | Reynolds et al. |
| 2013/0074492 A1 | 3/2013 | Chi et al. |
| 2013/0074512 A1 | 3/2013 | Tillery |
| 2013/0081374 A1 | 4/2013 | Giffin et al. |
| 2013/0091852 A1 | 4/2013 | Wood et al. |
| 2013/0094937 A1 | 4/2013 | Glahn et al. |
| 2013/0094943 A1 | 4/2013 | Bouru et al. |
| 2013/0096786 A1 | 4/2013 | Jang |
| 2013/0098046 A1 | 4/2013 | Suciu et al. |
| 2013/0098050 A1 | 4/2013 | Kupratis |
| 2013/0098055 A1 | 4/2013 | Kupratis |
| 2013/0104560 A1 | 5/2013 | Kupratis |
| 2013/0125561 A1 | 5/2013 | Schwarz et al. |
| 2013/0139519 A1 | 6/2013 | Kesseli et al. |
| 2013/0145745 A1 | 6/2013 | Kohlenberg et al. |
| 2013/0149099 A1 | 6/2013 | Kohlenberg et al. |
| 2013/0149111 A1 | 6/2013 | Kohlenberg et al. |
| 2013/0149112 A1 | 6/2013 | Kohlenberg et al. |
| 2013/0149113 A1 | 6/2013 | Kohlenberg et al. |
| 2013/0149143 A1 | 6/2013 | Gibson |
| 2013/0163905 A1 | 6/2013 | Vintinner et al. |
| 2013/0186060 A1 | 7/2013 | Kosheleff |
| 2013/0186191 A1 | 7/2013 | Elassi |
| 2013/0189117 A1 | 7/2013 | Baltas |
| 2013/0192199 A1 | 8/2013 | Merry et al. |
| 2013/0192200 A1 | 8/2013 | Kupratis et al. |
| 2013/0192201 A1 | 8/2013 | Kupratis et al. |
| 2013/0192232 A1 | 8/2013 | Clemen |
| 2013/0192238 A1 | 8/2013 | Munsell et al. |
| 2013/0192239 A1 | 8/2013 | Glahn et al. |
| 2013/0192240 A1 | 8/2013 | Munsell et al. |
| 2013/0192241 A1 | 8/2013 | Blackwell et al. |
| 2013/0192242 A1 | 8/2013 | Davis et al. |
| 2013/0192247 A1 | 8/2013 | Blackwell et al. |
| 2013/0192248 A1 | 8/2013 | Ackermann et al. |
| 2013/0192250 A1 | 8/2013 | Glahn et al. |
| 2013/0192251 A1 | 8/2013 | Munsell et al. |
| 2013/0192252 A1 | 8/2013 | Ackermann et al. |
| 2013/0192253 A1 | 8/2013 | Ackermann et al. |
| 2013/0192256 A1 | 8/2013 | Suciu et al. |
| 2013/0192258 A1 | 8/2013 | Kupratis et al. |
| 2013/0192260 A1 | 8/2013 | Mayer et al. |
| 2013/0192261 A1 | 8/2013 | Mayer et al. |
| 2013/0192262 A1 | 8/2013 | Eastwood et al. |
| 2013/0192266 A1 | 8/2013 | Houston et al. |
| 2013/0192519 A1 | 8/2013 | Kim et al. |
| 2013/0195624 A1 | 8/2013 | Schwarz et al. |
| 2013/0195641 A1 | 8/2013 | Povey |
| 2013/0195645 A1 | 8/2013 | Suciu et al. |
| 2013/0195647 A1 | 8/2013 | Muldoon et al. |
| 2013/0199179 A1 | 8/2013 | Kitsukawa et al. |
| 2013/0202415 A1 | 8/2013 | Karl et al. |
| 2013/0209291 A1 | 8/2013 | Kitsukawa |
| 2013/0216364 A1 | 8/2013 | Evans |
| 2013/0219856 A1 | 8/2013 | Suciu |
| 2013/0219859 A1 | 8/2013 | Suciu et al. |
| 2013/0219860 A1 | 8/2013 | Suciu |
| 2013/0219895 A1 | 8/2013 | Joshi et al. |
| 2013/0219908 A1 | 8/2013 | Schwarz et al. |
| 2013/0219922 A1 | 8/2013 | Gilson et al. |
| 2013/0220288 A1 | 8/2013 | Klingbeil |
| 2013/0223973 A1 | 8/2013 | Ali |
| 2013/0223977 A1 | 8/2013 | Ali |
| 2013/0223992 A1 | 8/2013 | Suciu |
| 2013/0223993 A1 | 8/2013 | Merry et al. |
| 2013/0233970 A1 | 9/2013 | Cottet |
| 2013/0236296 A1 | 9/2013 | Collopy et al. |
| 2013/0239587 A1 | 9/2013 | Karl et al. |
| 2013/0255275 A1 | 10/2013 | Schwarz et al. |
| 2013/0259651 A1 | 10/2013 | Kupratis et al. |
| 2013/0259653 A1 | 10/2013 | Schwarz et al. |
| 2013/0263592 A1 | 10/2013 | Lotterman et al. |
| 2013/0269311 A1 | 10/2013 | Wichmann et al. |
| 2013/0269479 A1 | 10/2013 | Van Der Merwe et al. |
| 2013/0276424 A1 | 10/2013 | Topol et al. |
| 2013/0277443 A1 | 10/2013 | Croll et al. |
| 2013/0280031 A1 | 10/2013 | Hurlin et al. |
| 2013/0283821 A1 | 10/2013 | Gilson et al. |
| 2013/0287581 A1 | 10/2013 | Aschermann et al. |
| 2013/0298522 A1 | 11/2013 | Eleftheriou et al. |
| 2013/0305714 A1 | 11/2013 | Rollinger et al. |
| 2013/0305731 A1 | 11/2013 | Morris et al. |
| 2013/0312419 A1 | 11/2013 | Merry et al. |
| 2013/0318939 A1 | 12/2013 | Parnin |
| 2013/0318940 A1 | 12/2013 | Parnin |
| 2013/0318988 A1 | 12/2013 | Robinson |
| 2013/0318998 A1 | 12/2013 | Schwarz et al. |
| 2013/0319010 A1 | 12/2013 | Hui et al. |
| 2013/0321824 A1 | 12/2013 | Hockaday |
| 2013/0323012 A1 | 12/2013 | Dong et al. |
| 2013/0323072 A1 | 12/2013 | Aschermann et al. |
| 2013/0334824 A1 | 12/2013 | Freda |
| 2013/0340406 A1 | 12/2013 | Gallagher et al. |
| 2013/0343896 A1 | 12/2013 | Mackie et al. |
| 2014/0000269 A1 | 1/2014 | Idahosa et al. |
| 2014/0003915 A1 | 1/2014 | Topol et al. |
| 2014/0007585 A1 | 1/2014 | Liu |
| 2014/0030087 A1 | 1/2014 | Soria et al. |
| 2014/0044540 A1 | 2/2014 | Uneura |
| 2014/0060075 A1 | 3/2014 | Glahn et al. |
| 2014/0061392 A1 | 3/2014 | Karem |
| 2014/0083107 A1 | 3/2014 | Sheridan et al. |
| 2014/0083115 A1 | 3/2014 | Von Nieda |
| 2014/0093350 A1 | 4/2014 | Meisner et al. |
| 2014/0096508 A1 | 4/2014 | McCune et al. |
| 2014/0096534 A1 | 4/2014 | Snape |
| 2014/0102076 A1 | 4/2014 | Adams et al. |
| 2014/0109571 A1 | 4/2014 | Primus et al. |
| 2014/0112774 A1 | 4/2014 | Freeman et al. |
| 2014/0112784 A1 | 4/2014 | Pascal |
| 2014/0119908 A1 | 5/2014 | Chrabascz et al. |
| 2014/0125121 A1 | 5/2014 | Edwards et al. |
| 2014/0130503 A1 | 5/2014 | Leep |
| 2014/0148928 A1 | 5/2014 | Stewart |
| 2014/0154064 A1 | 6/2014 | Bouteiller et al. |
| 2014/0157752 A1 | 6/2014 | Hasel et al. |
| 2014/0157753 A1 | 6/2014 | Hasel et al. |
| 2014/0157754 A1 | 6/2014 | Hasel et al. |
| 2014/0157755 A1 | 6/2014 | Hasel et al. |
| 2014/0157756 A1 | 6/2014 | Hasel et al. |
| 2014/0165534 A1 | 6/2014 | Hasel et al. |
| 2014/0174055 A1 | 6/2014 | Adams et al. |
| 2014/0174056 A1 | 6/2014 | Suciu |
| 2014/0182309 A1 | 7/2014 | Ali |
| 2014/0186158 A1 | 7/2014 | Merry et al. |
| 2014/0190163 A1 | 7/2014 | Maier |
| 2014/0191088 A1 | 7/2014 | Karem |
| 2014/0193238 A1 | 7/2014 | Sheridan et al. |
| 2014/0195134 A1 | 7/2014 | Maier |
| 2014/0196470 A1 | 7/2014 | Glahn et al. |
| 2014/0196472 A1 | 7/2014 | Kupratis et al. |
| 2014/0196473 A1 | 7/2014 | Kupratis et al. |
| 2014/0202133 A1 | 7/2014 | Praisner et al. |
| 2014/0205438 A1 | 7/2014 | Hasel |
| 2014/0205439 A1 | 7/2014 | Merry et al. |

(56) References Cited

U.S. PATENT DOCUMENTS

| | | |
|---|---|---|
| 2014/0205457 A1 | 7/2014 | Curlier et al. |
| 2014/0216003 A1 | 8/2014 | Phillips et al. |
| 2014/0216004 A1 | 8/2014 | Munsell |
| 2014/0219783 A1 | 8/2014 | Coffin et al. |
| 2014/0234078 A1 | 8/2014 | Sheridan et al. |
| 2014/0234089 A1 | 8/2014 | Moradell-Casellas et al. |
| 2014/0245749 A1 | 9/2014 | Mercier et al. |
| 2014/0248116 A1 | 9/2014 | Ali |
| 2014/0248129 A1 | 9/2014 | Merry et al. |
| 2014/0260326 A1 | 9/2014 | Schwarz et al. |
| 2014/0263712 A1 | 9/2014 | Froemming et al. |
| 2014/0270605 A1 | 9/2014 | Rosen et al. |
| 2014/0271112 A1 | 9/2014 | Morin et al. |
| 2014/0271135 A1 | 9/2014 | Sheridan et al. |
| 2014/0277991 A1 | 9/2014 | Skertic et al. |
| 2014/0283500 A1 | 9/2014 | Sabnis |
| 2014/0290211 A1 | 10/2014 | Kupratis et al. |
| 2014/0301829 A1 | 10/2014 | Reinhardt |
| 2014/0301837 A1 | 10/2014 | Dezeustre et al. |
| 2014/0308123 A1 | 10/2014 | Nussenblatt et al. |
| 2014/0314541 A1 | 10/2014 | Schwarz et al. |
| 2014/0326826 A1 | 11/2014 | Certain |
| 2015/0016994 A1 | 1/2015 | Burghardt |
| 2015/0337901 A1 | 11/2015 | Hayashi et al. |
| 2016/0146025 A1 | 5/2016 | Miller et al. |
| 2017/0138306 A1 | 5/2017 | Miller et al. |
| 2017/0138307 A1* | 5/2017 | Miller ............... F02K 3/06 |
| 2019/0096509 A1 | 3/2019 | Knoop et al. |
| 2020/0024981 A1 | 1/2020 | Niergarth et al. |
| 2021/0003139 A1 | 1/2021 | Miller et al. |

FOREIGN PATENT DOCUMENTS

| | | |
|---|---|---|
| CA | 2403632 A1 | 3/2004 |
| CA | 2798211 A1 | 6/2013 |
| CA | 2917362 A1 | 1/2015 |
| CN | 102220904 A | 10/2011 |
| CN | 102483038 A | 5/2012 |
| EP | 0203881 A1 | 12/1986 |
| EP | 0992696 A1 | 4/2000 |
| EP | 1254831 A1 | 11/2002 |
| EP | 1340902 A2 | 9/2003 |
| EP | 1619391 A2 | 1/2006 |
| EP | 2009246 A2 | 12/2008 |
| EP | 2607231 A2 | 6/2013 |
| FR | 2964942 A1 | 3/2012 |
| GB | 1418905 | 12/1975 |
| GB | 2218747 A | 11/1989 |
| GB | 2226087 A | 6/1990 |
| JP | S50124011 A | 9/1975 |
| JP | S61275550 A | 12/1986 |
| JP | H01314696 A | 12/1989 |
| JP | H0224293 A | 1/1990 |
| JP | H02179598 A | 7/1990 |
| JP | H02238160 A | 9/1990 |
| JP | H02245455 A | 10/1990 |
| JP | H05149328 A | 6/1993 |
| JP | H05149329 A | 6/1993 |
| JP | H05164132 A | 6/1993 |
| JP | 2006046322 A | 2/2006 |
| JP | 2007100928 A | 4/2007 |
| JP | 2007192315 A | 8/2007 |
| JP | 2008519229 A | 6/2008 |
| JP | 2009115139 A | 5/2009 |
| JP | 2010001992 A | 1/2010 |
| JP | 2012521516 A | 9/2012 |
| JP | 2013/079680 A | 5/2013 |
| JP | 2013/523526 A | 6/2013 |
| JP | 2013/256397 A | 12/2013 |
| JP | 2014/088893 A | 5/2014 |
| JP | 2014/152788 A | 8/2014 |
| JP | 2014/520035 A | 8/2014 |
| JP | 2014173635 A | 9/2014 |
| JP | 2015059645 A | 3/2015 |
| WO | WO2006080055 A1 | 8/2006 |
| WO | WO2008117413 A1 | 10/2008 |
| WO | WO2013/141935 A1 | 9/2013 |
| WO | WO2015/047489 A1 | 4/2015 |
| WO | WO2015/048464 A1 | 4/2015 |

OTHER PUBLICATIONS

Pratt & Whitney Canada PW600, Wikipedia The Free Encyclopedia, Aug. 1, 2012, 3 Pages.

* cited by examiner

LEVERED COUNTERWEIGHT FEATHERING SYSTEM

FIELD

The present disclosure generally relates to a gas turbine engine and, more particularly, to a gas turbine engine having a variable pitch fan.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

In some gas turbine engines, a variable pitch fan assembly is utilized to control a pitch of the fan blades. As the pitch of the fan blades is adjusted, an amount of drag of the fan blades is changed. In existing variable pitch fan assemblies, under certain failure modes where the ability to control a pitch of the fan blades is lost, a natural centrifugal twist moment of the fan blades will rotate the fan blades to a high drag (e.g., fine) position. In existing engine designs, there is limited room to implement a feathering system to address the issue of centrifugal twist moment causing unwanted blade rotation.

BRIEF DESCRIPTION

Aspects and advantages of the disclosure will be set forth in part in the following description, or may be obvious from the description, or may be learned through practice of the disclosure.

A fan assembly for a gas turbine engine includes a fan disk, a trunnion, an actuation device, a fan blade, and a counterweight assembly. The fan disk is configured to rotate about an axial centerline of the gas turbine engine. The trunnion is mounted to the fan disk. The actuation device is operably coupled to the trunnion. The fan blade defines a pitch axis and is rotatably attached to the fan disk about its pitch axis through the trunnion. The counterweight assembly includes a link arm, a lever arm, a hinge, and a counterweight. The link arm is connected to the trunnion, to the actuation device, or to both. The link arm is configured to drive rotation of the trunnion relative to the fan disk. The hinge is pivotably connected to the lever arm. The lever arm is connected to the link arm and is disposed to rotate about a connection point of the lever arm and the hinge. The counterweight is mounted to the lever arm at a location spaced from the hinge.

A counterweight assembly for use in a gas turbine engine includes a link arm, a lever arm, a hinge, and a counterweight. The link arm is configured to couple with a pitch change mechanism of the gas turbine engine, to a trunnion of a fan assembly of the gas turbine engine, or to both. The link arm is configured to drive rotation of the trunnion when coupled to the pitch change mechanism, to the trunnion, or to both. The hinge is pivotably connected to the lever arm. The lever arm is connected to the link arm and is disposed to rotate about a connection point of the lever arm and the hinge. The counterweight is mounted to the lever arm at a location spaced from the hinge. The counterweight is configured to move in response to a change in centrifugal load applied to the counterweight during operation of the gas turbine engine.

A gas turbine engine includes a compressor section, a combustion section, a turbine section, and a fan assembly. The combustion section is connected to and is disposed downstream from the compressor section. The turbine section is connected to and is disposed downstream from the combustion section. The compressor section, the combustion section, and the turbine section define a core turbine engine. The fan assembly is connected to and is disposed upstream from the compressor section. The fan assembly includes a fan disk, a trunnion, an actuation device, a fan blade, and a counterweight assembly. The fan disk is configured to rotate about an axial centerline of the gas turbine engine when installed in the gas turbine engine. The trunnion is mounted to the fan disk. The actuation device is operably coupled to the trunnion. The fan blade defines a pitch axis and is rotatably attached to the fan disk about its pitch axis through the trunnion. The counterweight assembly includes a link arm, a lever arm, a hinge, and a counterweight. The link arm is connected to the trunnion, to the actuation device, or to both. The link arm is configured to drive rotation of the trunnion relative to the fan disk. The hinge is pivotably connected to the lever arm. The lever arm connected to the link arm and is disposed to rotate about a connection point of the lever arm and the hinge. The counterweight is mounted to the lever arm at a location spaced from the hinge.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Figure 1:
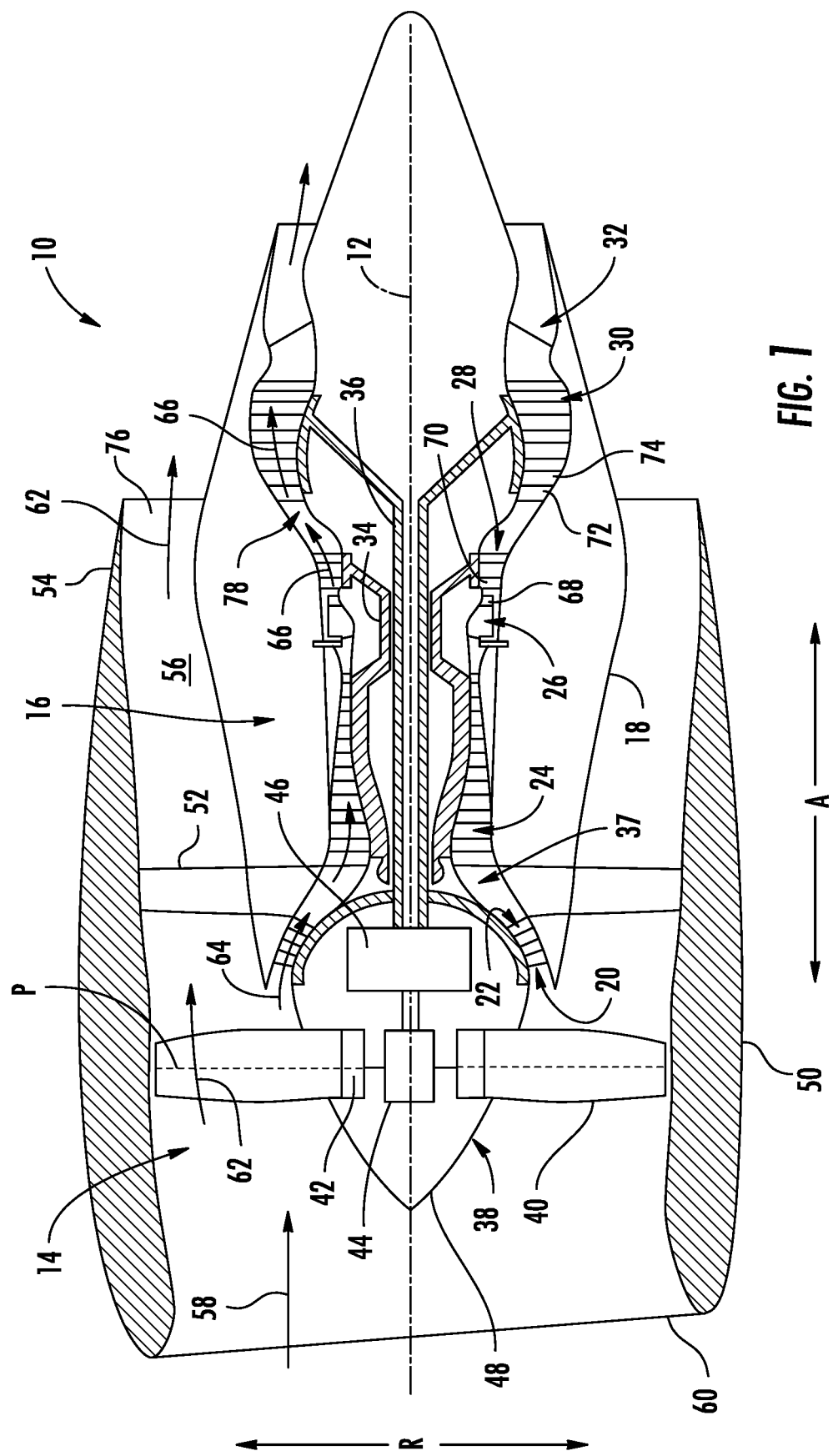
FIG. 1 is a schematic cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a passive feathering system for a fan section of a gas turbine engine. For example, the disclosure presents various embodiments of a levered counterweight assembly attached to the pitch change system for each fan blade of the fan. As the counterweights actuate in response to centrifugal force experienced by the counterweights, the counterweight assembly transfers torque to the pitch change mechanism which then rotates the fan blade. The counterweights are positioned on levers supported by hinges beneath the fan rotor hub and eliminate the need for complex gearing. The proposed disclosure allows for a gearless, high mechanical advantage system by positioning the counterweight and the lever components in a plane where there are less spatial constraints due to blade-to-blade spacing. Additionally, the added lever arm length of the counterweights helps minimize the overall weight required to achieve the desired feathering capability.

Referring now to the drawings, wherein identical numerals indicate the same elements throughout the figures, FIG. 1 is a schematic cross-sectional view of gas turbine engine 10 according to various embodiments of the present subject matter. FIG. 1 shows More particularly, for the embodiment of FIG. 1, the gas turbine engine is a high-bypass turbofan jet engine, referred to herein as a "gas turbine engine 10." As shown in FIG. 1, gas turbine engine 10 defines an axial direction A (extending parallel to an axial centerline 12 provided for reference) and a radial direction R. In general, gas turbine engine 10 includes a fan section 14 and a core turbine engine 16 disposed downstream from fan section 14.

Core turbine engine 16 depicted herein generally includes a substantially tubular outer casing 18 that defines an annular inlet 20. Outer casing 18 encases, in serial flow relationship, a compressor section including a booster or low pressure ("LP") compressor 22 and a high pressure ("HP") compressor 24; a combustion section 26; a turbine section including a high pressure ("HP") turbine 28 and a low pressure ("LP") turbine 30; and a jet exhaust nozzle section 32. In one example, the LP compressor 22 and the HP compressor 24 can be collectively referred to as a compressor section. In another example, the HP turbine 28 and the LP turbine 30 can be collectively referred to as the turbine section. A high pressure ("HP") shaft or spool 34 drivingly connects the HP turbine 28 to the HP compressor 24. A low pressure ("LP") shaft or spool 36 drivingly connects LP turbine 30 to LP compressor 22. The compressor section (e.g., the LP compressor 22 and the HP compressor 24), combustion section 26, the turbine section (e.g., the HP turbine 28 and the LP turbine 30), and jet exhaust nozzle section 32 together define a core air flowpath 37.

For the embodiment depicted, fan section 14 includes a variable pitch fan 38 having a plurality of fan blades 40 coupled to a disk 42 in a spaced apart manner. In one example, variable pitch fan 38 can be referred to as a fan assembly. In another example, disk 42 can be referred to as a fan disk. Disk 42 is configured to rotate about axial centerline 12 of gas turbine engine 10 when installed in gas turbine engine 10. As depicted, fan blades 40 extend outwardly from disk 42 generally along radial direction R. Each fan blade 40 is rotatable relative to disk 42 about a pitch axis P by virtue of fan blades 40 being operatively coupled to a suitable trunnion 44 configured to collectively vary the pitch of fan blades 40 in unison. Fan blades 40, disk 42, and trunnion 44 are together rotatable about axial centerline 12 by LP shaft or spool 36 across a power gear box 46. Power gear box 46 includes a plurality of gears for adjusting a rotational speed of fan 38 relative to LP shaft or spool 36 to a more efficient rotational fan speed.

Referring still to the exemplary embodiment of FIG. 1, disk 42 is covered by rotatable front hub 48 aerodynamically contoured to promote an airflow through the plurality of fan blades 40. Additionally, fan section 14 includes an annular fan casing or outer nacelle 50 that circumferentially surrounds variable pitch fan 38 and/or at least a portion of core turbine engine 16. It should be appreciated that nacelle 50 may be configured to be supported relative to core turbine engine 16 by a plurality of circumferentially-spaced outlet guide vanes 52. Moreover, a downstream section 54 of nacelle 50 may extend over an outer portion of core turbine engine 16 so as to define a bypass airflow passage 56 therebetween.

During operation of gas turbine engine 10, a volume of air 58 enters gas turbine engine 10 through an associated inlet 60 of nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through LP turbine 30 where a second portion of thermal and kinetic energy is extracted from the combustion gases 66 via sequential stages of LP turbine stator vanes 72 that are coupled to outer casing 18 and LP turbine rotor blades 74 that are coupled to the LP shaft or spool 36, thus causing the LP shaft or spool 36 to rotate, thereby supporting operation of LP compressor 22 and/or rotation of fan 38.

The combustion gases 66 are subsequently routed through the jet exhaust nozzle section 32 of core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of gas turbine engine 10, also providing propulsive thrust. The HP turbine 28, LP turbine 30, and the jet exhaust nozzle section 32 at least partially define a hot gas path 78 for routing the combustion gases 66 through core turbine engine 16.

It should be appreciated, however, that the exemplary gas turbine engine 10 depicted in FIG. 1 is by way of example only, and that in other exemplary embodiments, gas turbine engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

During operation of gas turbine engine 10, failure scenarios can occur involving the loss of control pitch (e.g., degree of rotation) of one or more fan blades 40. In such an instance, the natural centrifugal twist moment of the blade geometry will naturally rotate fan blades 40 to a high drag (e.g., fine) position without corrective action. To counter-act this natural centrifugal twist moment of fan blades 40, a feathering device is used to correct the change in pitch of fan blades 40. As discussed herein, "feathering" is a safety feature required to reduce wind milling drag of variable pitch fan 38 under a failure scenario where the ability to the pitch of one or more fan blades 40 is lost.

Figure 2:
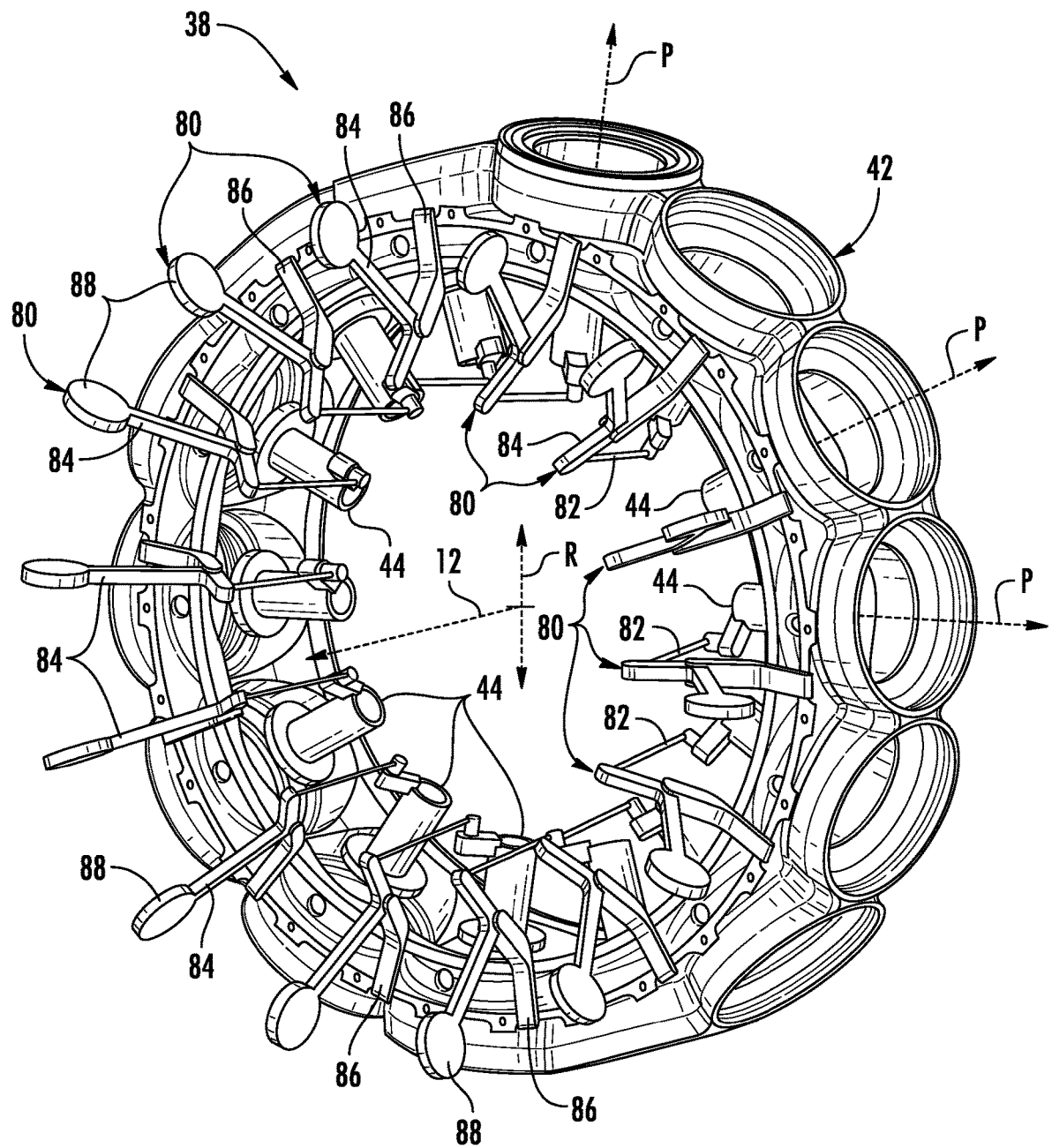
FIG. 2 is a perspective isolated view of a fan hub including a plurality of trunnions and counterweight assemblies.

Referring now to FIG. 2, FIG. 2 is a perspective isolated view of a variable pitch fan 38 with trunnions 44 and counterweight assemblies 80. FIG. 2 shows an axial centerline 12, a variable pitch fan 38, pitch axes P, a disk 42, trunnions 44, and counterweight assemblies 80 (with each counterweight assembly 80 including a link arm 82, a lever arm 84, a hinge 86, and a counterweight 88). In the example shown in FIG. 2, fan blades 40 are omitted for clarity. As shown in FIG. 2, a downstream direction is shown as left-to-right. In another example, a downstream direction could be from right-to-left as shown in FIG. 2.

As shown in FIG. 2, each trunnion 44 includes a generally tubular shape with a lip or collar on an end of trunnion 44 closest to disk 42. In this example, each trunnion 44 is coupled to one of fan blades 40 (shown in FIG. 1) such that each fan blade 40 is rotatable relative to disk 42 about the respective pitch axis P of each fan blade 40. Each trunnion 44 is disposed to drive rotation of one of fan blades 40.

Each counterweight assembly 80 is operably coupled to one of trunnions 44. In this example, counterweight assemblies 80 are evenly distributed along a circumferential direction of disk 42 with a number of counterweight assemblies 80 matching the number of trunnions 44. Counterweight assemblies 80 are configured to drive a rotation of trunnions 44 in response to centrifugal force experienced by counterweights 88.

Link arms 82 and lever arms 84 are, for the embodiment shown, elongated pieces of solid material. In one example, link arms 82 and lever arms 84 can include rods. Link arm 82 is configured to couple with trunnion 44. Each link arm 82 is connected to and extends between one of trunnions 44 and one of lever arms 84. Link arms 82 transfer motion and torque from lever arms 84 to trunnions 44. In this way, link arm 82 is configured to drive rotation of trunnion 44 relative to disk 42.

Each lever arm 84 is connected to and extends between one of link arms 82 and one of counterweights 88. A connection point of lever arm 84 to hinge 86 includes a pivot (or pivot point). In one example, lever arms 84 can be pivotably or rotatably connected to link arms 82. Put another way, lever arm 84 and hinge 86 define a pivoted connection point. In another example, lever arms 84 can be fixedly connected to or joined with link arms 82. Lever arms 84 are disposed to transfer movement/motion (e.g., angular motion/rotation) of counterweights 88 to link arms 82.

In this example, hinges 86 are pieces of solid material configured to enable rotation of another component about a pivot point of hinges 86. Each hinge 86 is pivotably connected to one of lever arms 84. For example, each one of lever arms 84 is disposed to rotate about the connection point of one of lever arms 84 and one of hinges 86. A connection point of lever arm 84 to hinge 86 includes a pivot. Hinges 86 provide a pivot about which lever arms 84 rotate in order to transfer rotation from lever arms 84 to link arms 82.

Counterweights 88 are weights or piece of solid material with mass. In this example, a shape of counterweights 88 includes a disk. In other examples, the shape of counterweights 88 can include a spheroid, an ellipsoid, an angular portion of a flat ring, a parallelogram, or another geometric shape. Each counterweight 88 is mounted to an end of one of lever arms 84 on an end opposite from hinge 86. Each counterweight 88 is mounted to one of lever arms 84 at a location spaced from one of the hinges 86. Each of counterweights 88 are configured to move in response to a change in centrifugal load applied to counterweight 88 during operation of variable pitch fan 38. For example, during certain operational (e.g., failure) modes of gas turbine engine 10, fan blades 40 (shown in FIG. 1) of variable pitch fan 38 will rotate in response to a natural centrifugal twist moment. Such rotation can lead fan blades 40 to rotate into an undesirable high drag (e.g., fine) position. In response to centrifugal forces experienced by counterweights 88, counterweights 88 transmit the torque they generate to trunnions 44 (via lever arms 84, hinges 86, and link arms 82) to overcome this centrifugal twist moment and rotate fan blades 40 to a low drag or feathered (e.g., coarse) position. A mass, a density, and a shape of counterweights 88 can be tuned and/or tailored based upon desired performance characteristic of counterweight assemblies 80. In this example, a single counterweight assembly 80 per fan blade 40 acts to minimize combined failure modes.

As proposed, counterweight assemblies 80 introduce sufficient torque to each blade trunnion axis to overcome the centrifugal twist moment and rotate each of fan blades 40 to a low drag or a feathered (e.g., coarse) position. Additionally, as shown in FIG. 2, counterweight assemblies 80 are configured such that each counterweight 88 is unobstructed by an adjacent counterweight 88. As will be discussed with respect to subsequent figures, FIG. 2 shows counterweight assemblies positioned in such a way that there are no spacing constraints between fan blades 40 or between adjacent counterweight assemblies 80 prohibiting or blocking movement/motion of counterweights 88 during operation.

In certain configurations, weights can be mounted above the disk, offset from a centerline of the blade. However, in configurations with low radius ratios and higher fan blades, such configurations cannot be feasibly packaged, and the lack of mechanical advantage may result in a need for heavier weights. As will be discussed with respect to the subsequent figures, the mechanical advantage of counterweight assemblies 80 is high due to the positioning of a pivot point of hinges 86 at a lower radial position along lever arms 84. Due to this high mechanical advantage, the added length of lever arms 84 helps to minimize the overall weight of counterweights 88 required to achieve the desired feathering capability of counterweight assemblies 80.

Figure 3:
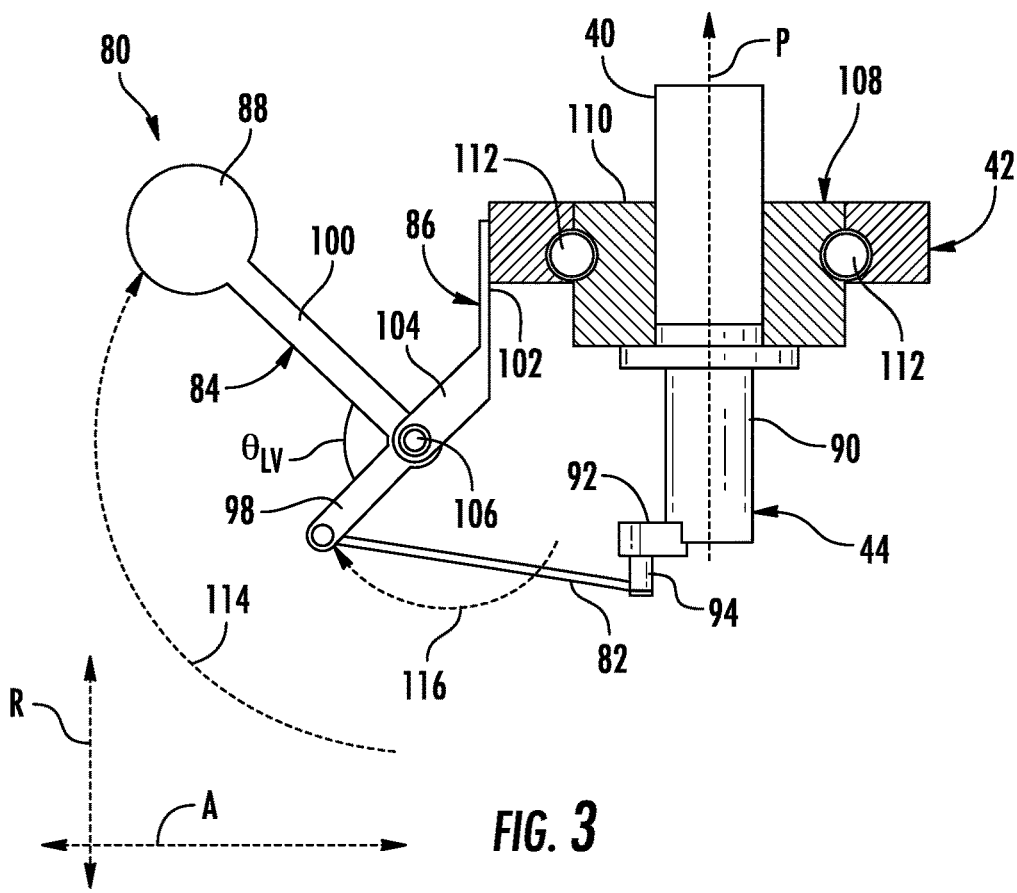
FIG. 3 is a side view of a rotor blade, a trunnion, and a counterweight assembly.

Referring now to FIG. 3, FIG. 3 is a side view of a counterweight assembly 80 attached to a trunnion 44. FIG. 3 shows a pitch axis P, a fan blade 40, a disk 42, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86 (including a first hinge portion 102, a second hinge portion 104, and a pivot 106), a counterweight 88), and a bearing assembly 108 (with a sleeve 110 and ball bearings 112). In the example shown here in FIG. 3, disk 42, sleeve 110, and ball bearings 112 are shown in cross-section.

Body 90 is a tube of solid material. Body 90 is mechanically coupled to fan blade 40 and is mounted to arm 92. Body 90 receives torque from arm 92 and transfers the torque to fan blade 40. Arm 92 is an extension of solid material extending along a radial direction outward from body 90. Arm 92 is connected to and extends between body 90 and pin 94. Arm 92 receives a force from pin 94 and transfers that force to body 90. Pin 94 is a short rod of solid material extending in a direction parallel to an axial direction of body 90 (and to pitch axis P of fan blade 40). Pin 94 is rotatably connected to arm 92 and connects link arm 82 to arm 92 of trunnion 44. Pin 94 receives a force from first lever portion 98 and transfers that force to pin 94.

First lever portion 98 and second lever portion 100 of lever arm 84 are flat, elongated pieces of solid material. In this example, first lever portion 98 and second lever portion 100 are shown as being out of alignment and disposed at an angle $\theta_{LV}$ with each other. In particular, angle $\theta_{LV}$ between first lever portion 98 and second lever portion 100 is shown as equaling approximately 90°. In other embodiments, angle $\theta_{LV}$ can be any angle depending on optimal design considerations. First lever portion 98 is connected to second lever portion 100 at angle $\theta_{LV}$. Second lever portion 100 is connected to and extends between first lever portion 98 and counterweight 88. Second lever portion 100 transfers torque from counterweight 88 to first lever portion 98. For example, as counterweight 88 experiences centrifugal force, second lever portion 100 is pushed along pathway 114 and causes first lever portion 98 to rotate in response to the rotation of second lever portion 100. A mechanical advantage of lever arm 84 is created by the length differential between first lever portion 98 and second lever portion 100.

First hinge portion 102 and second hinge portion 104 are, for the embodiment depicted, elongated pieces of solid material. First hinge portion 102 is mounted to disk 42 and extends between disk 42 and second hinge portion 104. First hinge portion 102 secures hinge 86 to disk 42. Second hinge portion 104 is pivotably connected to lever arm 84 and extends between pivot 106 and first hinge portion 102. Second hinge portion 104 houses pivot 106 about which lever arm 84 rotates.

Pivot 106 is a fulcrum or a point of rotation. In this example, lever arm 84 is disposed to pivot about pivot 106 of hinge 86. Pivot 106 is disposed in second hinge portion 104 of hinge 86. Pivot 106 is connected to and rotatably attaches lever arm 84 to hinge 86. During operation, lever arm 84 rotates about pivot 106 such that counterweight 88 travels along pathway 114. In this example, pathway 114 is shown as an arcuate pathway including a partially-circular arc. Similarly, a connection point between link arm 82 and first lever portion 98 of lever arm 84 travels along pathway 116. In this example, pathway 116 is shown as also including a partially-circular arc. Pivot 106 functions as a fulcrum about which lever arm 84 rotates relative to hinge 86.

Bearing assembly 108 is a group of components for enabling relative rotation between two or more components. Bearing assembly 108 is disposed in and mounted to disk 42. As counterweight assembly 80 drives rotation of trunnion 44, bearing assembly 108 enables relative rotation between disk 42 and sleeve 110.

Sleeve 110 is a generally tubular or frustoconical structure of solid material. Sleeve 110 is mounted in an opening of disk 42. Sleeve 110 provides a structural interface between trunnion 44 and fan blade 40. Ball bearings 112 are rolling element bearings. Ball bearings 112 are disposed between sleeve 110 and disk 42. Ball bearings 112 spin or rotate relative to sleeve 110 and disk 42 so as to enable rotation of fan blade 40 and trunnion 44 relative to disk 42.

As discussed above, counterweight assemblies 80 provide a large amount and an efficient level of mechanical advantage in driving rotation of trunnion 44 with counterweight assembly 80 due to the mechanical advantage of lever arm 84 as lever arm 84 rotates about pivot 106 of hinge 86.

Figure 4:
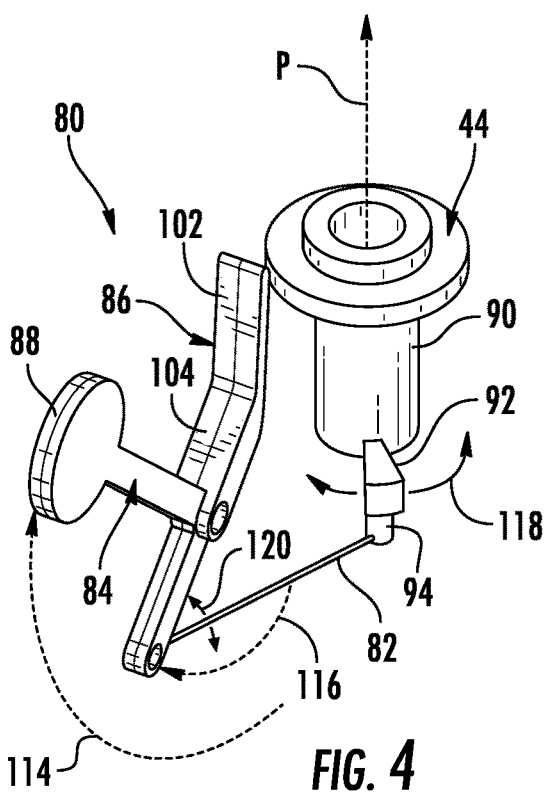
FIG. 4 is a perspective view of the trunnion and the counterweight assembly.

Referring now to FIG. 4, FIG. 4 is a perspective view of a trunnion 44 and a counterweight assembly 80. FIG. 4 shows a pitch axis P, a trunnion 44 (with a body 90, an arm 92, and a pin 94), a counterweight assembly 80 (with a link arm 82, a lever arm 84, a hinge 86, and a counterweight 88), a pathway 114, a pathway 116, an arm pathway 118, and a rotation direction 120.

Here, FIG. 4 includes arm pathway 118 of arm 92 of trunnion 44 as well as rotation direction 120 of link arm 82.

Arm pathway 118 of arm 92 shows rotational movement of arm 92 as counterweight assembly 80 drives rotation of trunnion 44.

Rotation direction 120 of link arm 82 shows the motion path of link arm 82 as link arm 82 rotates relative to the connection point between link arm 82 and lever arm 84. This rotation direction 120 of link arm 82 enables link arm 82 to move with pin 94 as arm 93 of trunnion 44 rotates along arm pathway 118. In this way, the ability of link arm 82 to rotate along rotation direction 120 enables trunnion 44 to rotate about pitch axis P while lever arm 84 of counterweight assembly 80 rotates along a single plane (see e.g., FIG. 5).

Figure 5:
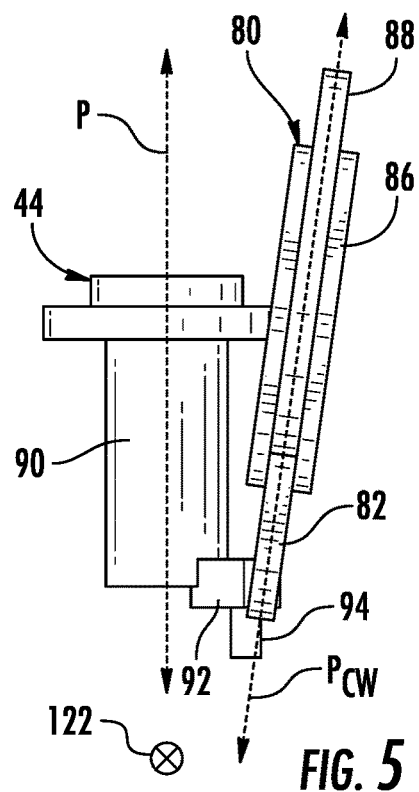
FIG. 5 is a front view of the trunnion and the counterweight assembly.

Referring now to FIG. 5, FIG. 5 is a front view looking aft along an axial direction 122 of a trunnion 44 and a counterweight assembly 80. FIG. 4 shows a pitch axis P, a trunnion 44 (with a body 90, an arm 92, and a pin 94), a counterweight assembly 80 (with a link arm 82, a lever arm 84, a hinge 86, and a counterweight 88), an axial direction 122, and a plane $P_{CW}$ of counterweight assembly 80.

Axial direction 122 is a direction oriented in alignment with axial centerline 12 of gas turbine engine 10 (see e.g., FIGS. 1-2). In FIG. 5, axial direction 122 is oriented as into and out of the page. In this example, axial direction 122 points in a downstream and upstream direction (into and out of the page, respectively as shown in FIG. 5) relative to gas turbine engine 10.

Plane $P_{CW}$ is plane of action along which lever arm 84, hinge 86, and counterweight 88 are aligned. Plane $P_{CW}$ also represents a translation plane along which lever arm 84 and counterweight 88 move or translate during operation of counterweight assembly 80. For example, in relation to pathway 114 of counterweight 88 shown in FIGS. 3-4, plane $P_{CW}$ is a plane along which pathway 114 travels and is aligned. With how plane $P_{CW}$ is shown in FIG. 5 as extending into and out of the page, pathway 114 lies along the same alignment of into and out of the page.

In this example, plane $P_{CW}$ is aligned parallel to axial direction 122 such that plane $P_{CW}$ extends into and out of the page. In one example, plane $P_{CW}$ of counterweight assembly 80 intersects with axial centerline 12 of gas turbine engine 10 (see e.g., FIG. 2 for depiction of axial centerline 12).

Here in FIG. 5, plane $P_{CW}$ is shown as offset from pitch axis P to account for arm pathway 118 of arm 92. Plane $P_{CW}$ is also shown as being out of alignment and/or non-parallel with pitch axis P of trunnion 44, and by extension out of alignment with the fan blade 40 (omitted from FIG. 5 for clarity) corresponding to trunnion 44. For example, Plane $P_{CW}$ is not aligned with pitch axis P of a fan blade 40 along an axial direction of disk 42. Put another way, plane $P_{CW}$ extends at an angle relative to pitch axis P such that plane $P_{CW}$ eventually intersects and crosses over pitch axis P. The misalignment and offset between pitch axis P and plane $P_{CW}$ eliminate spatial constraints of counterweight assembly 80 between adjacent fan blades 40 due to the ability of link arm 82 to move into and out of the page (as shown in FIG. 5) as lever arm 84 drives link arm 82 into the page thereby pushing pin 94 and causing arm 92 to rotate body 90 about pitch axis P. During this operation of counterweight assembly 80, the components of counterweight assembly 80 (e.g., link arm 82, lever arm 84, hinge 86, and counterweight 88) maneuver without coming into contact with components of adjacent counterweight assemblies 80 disposed about disk 42 (see e.g., FIG. 2).

Put another way, the misaligned or offset configuration of counterweight assembly 80 relative to pitch axis P also allows for a high mechanical advantage system by positioning the components of counterweight assembly 80 in such a way where there are less spatial constraints from spacing between adjacent fan blades 40.

Figure 6:
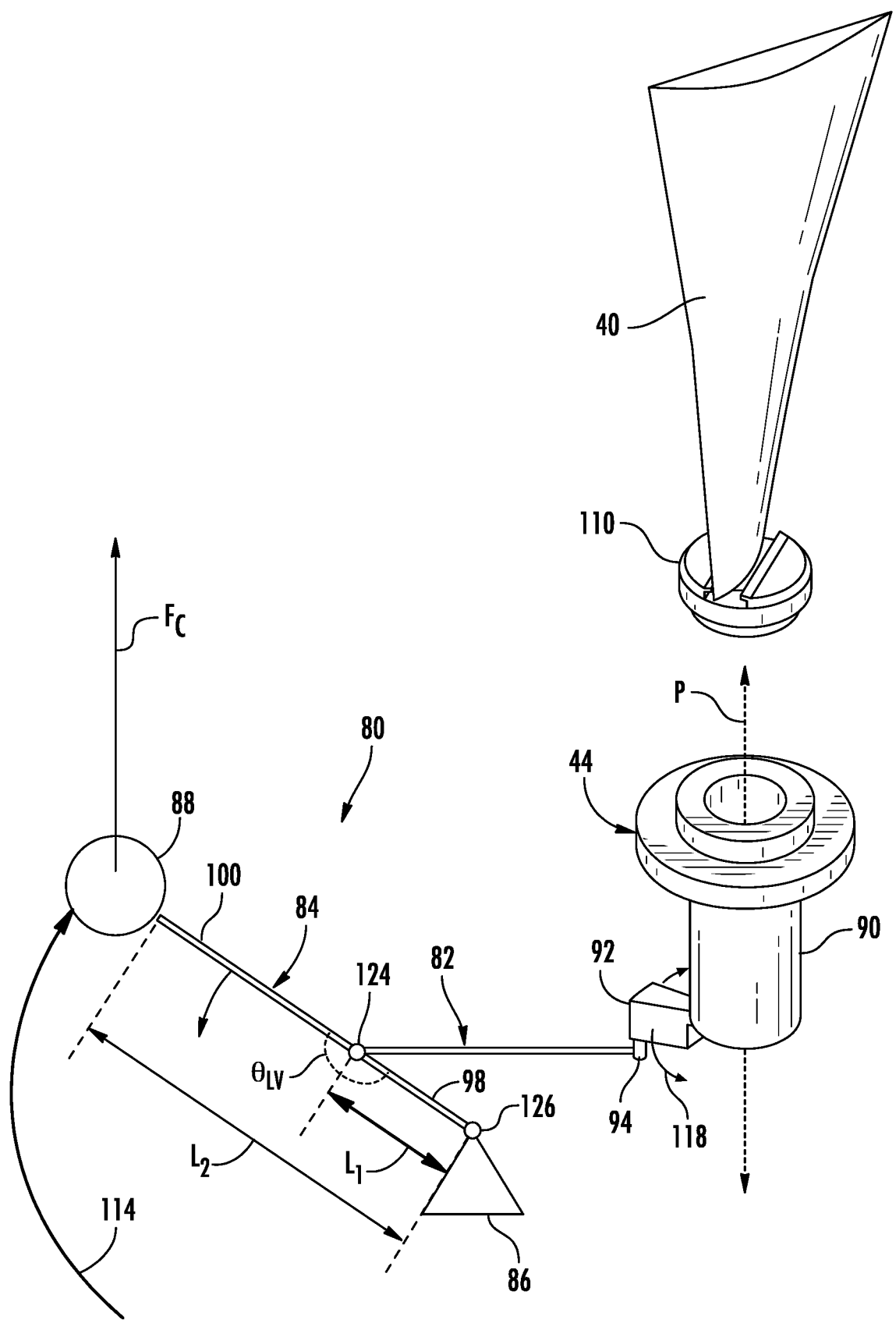
FIG. 6 is a simplified perspective view of a trunnion and a first counterweight assembly.

Referring now to FIG. 6, FIG. 6 is a simplified perspective view of a fan blade 40, a trunnion 44, and a counterweight assembly 80 shown in a first configuration. FIG. 6 shows a pitch axis P, a fan blade 40, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86, a counterweight 88, a sleeve 110, a pathway 114 of lever arm 84, an arm pathway 118 of arm 92, a connection point 124, a connection point 126, and a force Fc. In the example shown here in FIG. 6, first lever portion 98 include a first length $L_1$ and lever arm 84 includes a second length $L_2$.

In FIG. 6, hinge 86 is shown in a simplified view with a triangle and in such a way to clearly show the pivot or fulcrum functionality of hinge 86. In this example, hinge 86 connects to lever arm 84 at an end of lever arm 84 (e.g., at connection point 126).

First length $L_1$ is a length of first lever portion 98 of lever arm 84. Second length $L_2$ is a length of lever arm 84. In this example, first lever portion 98 and second lever portion 100 are shown as being in alignment with each. In such an example, angle $\theta_{LV}$ equals 180° (in comparison to angle $\theta_{LV}$ equaling approximately 90° in FIG. 3). In other examples, angle $\theta_{LV}$ can range from 0° to 90°, from 90° to 180°, or from 180° to 360°.

In this example, second length $L_2$ of lever arm 84 is greater than first length $L_1$ of first lever portion 98. In this way, a mechanical advantage is created by lever arm 84 because as counterweight 88 travels along pathway 114, counterweight 88 travels a greater distance along pathway 114 than connection point 124 (and link arm 82) travels. As connection point 124 travels in response to lever arm 84 rotating, link arm 82 transfers the motion from lever arm 84 to pin 94 which transfers torque to trunnion 44.

Another aspect of this example is that lever arm 84 connects to hinge 86 at connection point 126 located a distal end of first lever portion 98 (in contrast to FIGS. 3-4 which show hinge 86 connecting to a point at which first lever portion 98 connects to second lever portion 100). Likewise, in the example shown here in FIG. 6, lever arm 84 connects to link arm 82 at connection point 124 located where first lever portion 98 meets with second lever portion 100 (in contrast to FIGS. 3-4 which show lever arm 84 connecting to link arm 82 at a distal end of first lever portion 98). With connections points 124 and 126 including spherical bearing linkages, motion can be transferred form counterweight assembly 80 to trunnion 44 without the use of gears.

Connection point 124 is a point of connection between link arm 82 and lever arm 84. Connection point 126 is a point of connection between lever arm 84 and hinge 86. In this example, connections points 124 and 126 can include spherical bearings to allow for circumferential motion of link arm 82 and lever arm 84.

Force Fc is a centrifugal force applied to counterweight 88 as disk 42 (shown in FIG. 2) rotates during operation of gas turbine engine 10. For example, counterweight 88 is configured to move in response to a change in force Fc (e.g., change in centrifugal load) applied to counterweight 88 during operation of variable pitch fan 38 (see e.g., FIG. 1).

The embodiment shown here in FIG. 6 provides an example of a first configuration of counterweight assembly 80 with trunnion 44.

Figure 7:
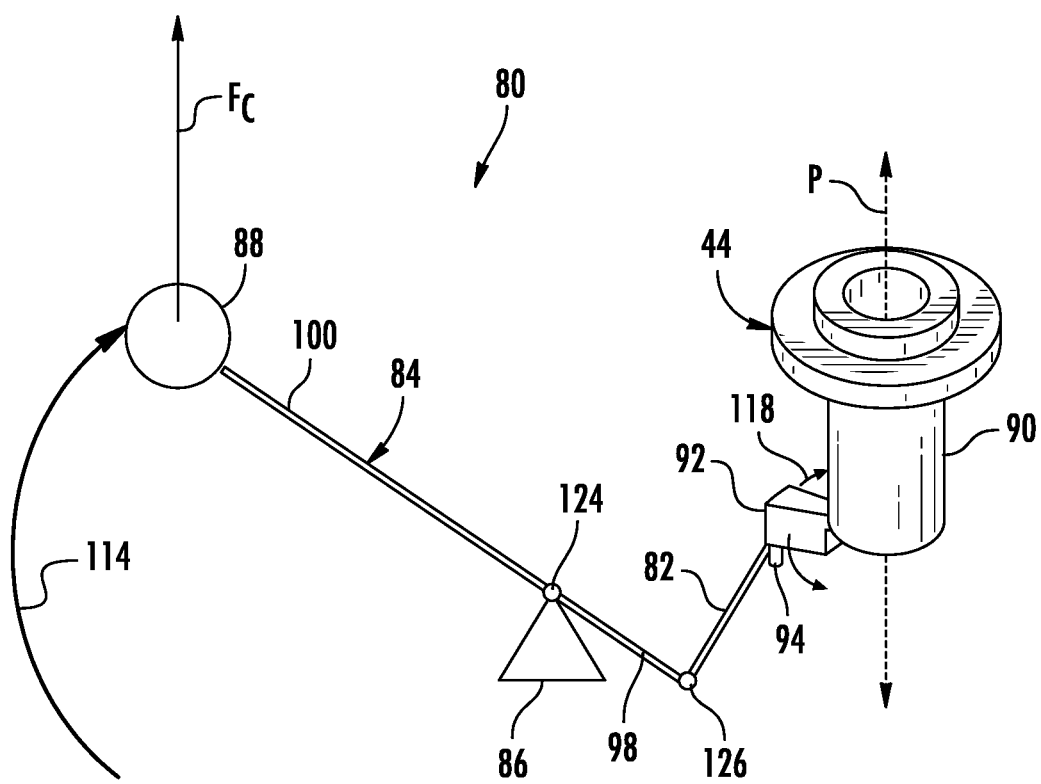
FIG. 7 is a simplified perspective view of a trunnion and a second counterweight assembly.

Referring now to FIG. 7, FIG. 7 is a simplified perspective view of a fan blade 40, a trunnion 44, and a counterweight assembly 80 shown in a second configuration. FIG. 7 shows a pitch axis P, a fan blade 40, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86, a counterweight 88), a pathway 114 of lever arm 84, an arm pathway 118 of arm 92, a connection point 124, a connection point 126, and a force Fc.

Here in FIG. 7, hinge 86 connects to lever arm 84 at connection point 124 which is positioned part way along a length of lever arm 84. In comparison, in FIG. 6, hinge 86 connects to lever arm 84 at connection point 126 located at a distal end of lever arm 84. As shown in FIG. 7, hinge 86 connects to lever arm at a distance from connection point 126, where connection point 126 is positioned at a terminal endpoint or distal end of lever arm 84 (of first lever portion 98 in particular).

The embodiment shown in FIG. 7 provides a second configuration of counterweight assembly 80 and trunnion 44. Such an alternate configuration allows for flexibility in kinematic design as well as enabling variations in part sizing to suit any design or operation requirements.

Figure 8:
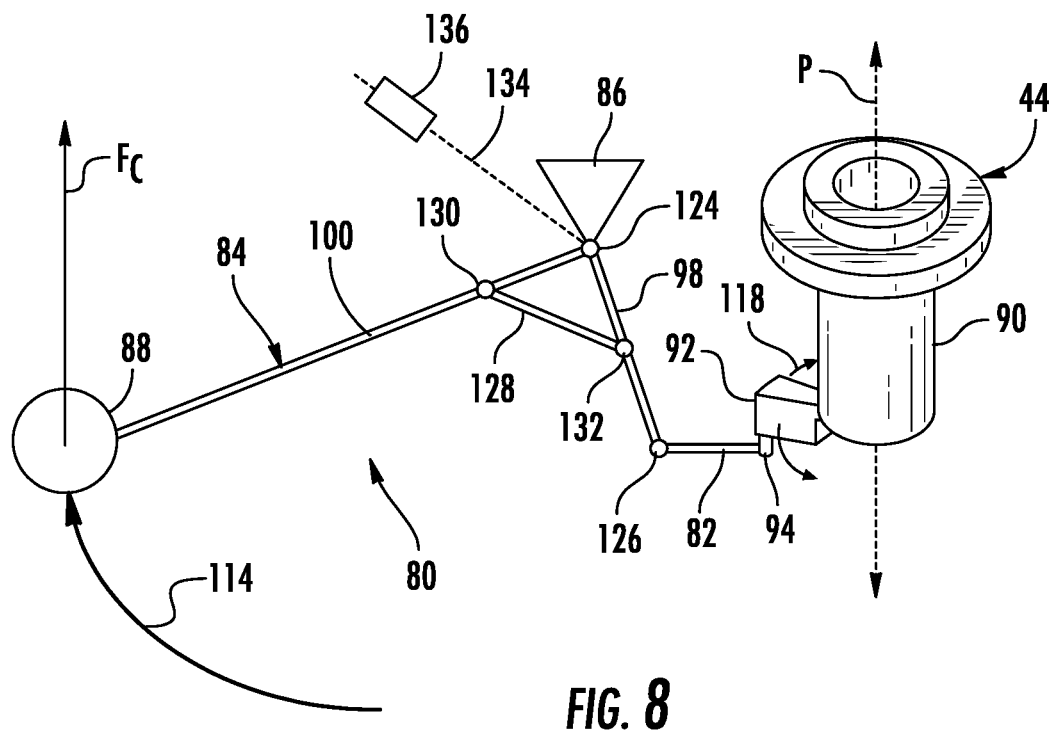
FIG. 8 is a simplified perspective view of a trunnion and a third counterweight assembly.

Referring now to FIG. 8, FIG. 8 is a simplified perspective view of a fan blade 40, a trunnion 44, and a counterweight assembly 80 shown in a third configuration. FIG. 8 shows a pitch axis P, a fan blade 40, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86, a counterweight 88, a pathway 114 of lever arm 84, an arm pathway 118 of arm 92, a connection point 124, a connection point 126, a truss arm 128, a connection point 130, a connection point 132, an angular position 134, a locking mechanism 136, and a force Fc.

Truss arm 128 is a rod of solid material. Connection point 130 is a point of connection between second lever portion 100 and truss arm 128. Connection point 132 is a point of connection between first lever portion 98 and truss arm 128. As in previous embodiments, connection points 130 and 132 can include a spherical ball bearing joint. In this example, truss arm 128 provide additional support to counterweight assembly 80 by bracing first lever portion 98 to second lever portion 100. Angular position 134 is an imaginary line and represents a pre-determined threshold angular position of lever arm 84.

Locking mechanism 136 is a mechanical fastener. In this example, locking mechanism 136 can include a latch or catch type device such as a latch bolt or a slam latch. Locking mechanism 136 is disposed along angular position 134. During operation, locking mechanism 136 acts as a lock to prevent lever arm 84 from any further angular motion. In one example, locking mechanism 136 can be mounted to disk 42 (shown in FIG. 2). In another example, locking mechanism 136 can be mounted to a portion of hinge 86.

In one example, when counterweight 88 swings to a full feathered position during a failure event (e.g., of gas turbine engine 10), locking mechanism 136 would engage with lever arm 84 if lever arm 84 reaches angular position 134. Once lever arm 84 reaches angular position 134 and locking mechanism 136 engages with lever arm 84 (or with counterweight 88), locking mechanism 136 prevents counterweight assembly 80 from returning to higher drag positions as a speed of variable pitch fan 38 (shown in FIGS. 1-2) decreases. In one example, a location of angular position 134 and of locking mechanism 136 would be beyond a normal operating range of counterweight assembly 80 and would never be at risk of triggering during normal, non-failure operational modes of gas turbine engine 10.

Here in FIG. 8, hinge 86 connects to lever arm 84 at connection point 124 which is positioned part at a point where first lever portion 98 and second lever portion 100 are connected to each other. In comparison, in FIG. 7, hinge 86 connects to lever arm 84 at connection point 124 away from a distal end of lever arm 84. As shown in FIG. 8, hinge 86 connects to lever arm at a distance from connection point 126, where connection point 126 is positioned at a terminal endpoint or distal end of lever arm 84 (of first lever portion 98 in particular).

The embodiment shown in FIG. 8 provides a third configuration of counterweight assembly 80 and trunnion 44. Similar to the embodiment shown in FIG. 7, such an alternate configuration allows for flexibility in kinematic design as well as enabling variations in part sizing to suit any design or operation requirements. An additional benefit with the configuration shown in FIG. 8 includes an additional safety measure (e.g., locking mechanism 136) during a failure mode, such as when oil pressure faces a sudden decrease or is lost.

Figure 9:
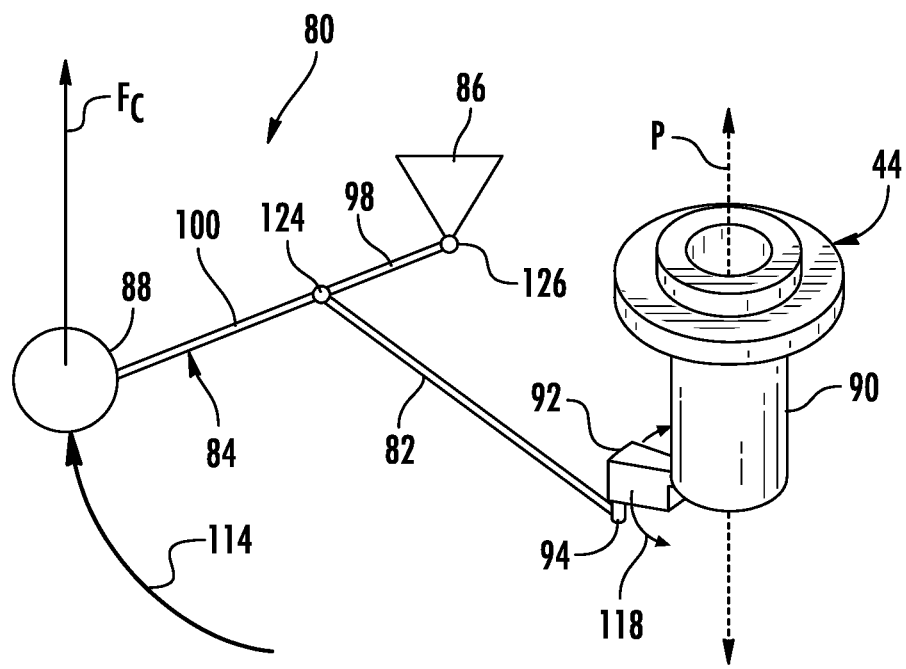
FIG. 9 is a simplified perspective view of a trunnion and a fourth counterweight assembly.

Referring now to FIG. 9, FIG. 9 is a simplified perspective view of a trunnion 44 and a counterweight assembly 80 shown in a fourth configuration. FIG. 9 shows a pitch axis P, a fan blade 40, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86, a counterweight 88), a sleeve 110, a pathway 114 of lever arm 84, an arm pathway 118 of arm 92, a connection point 124, a connection point 126, and a force Fc.

Here, the embodiment shown in FIG. 9 is similar to the embodiment shown in FIG. 6, but with FIG. 9 showing hinge 86 being positioned outward along a radial direction from connections points 124 and 126. Whereas in contrast, FIG. 6 shows hinge 86 being positioned inward along a radial direction from connection points 124 and 126.

The embodiment shown in FIG. 9 provides a fourth configuration of counterweight assembly 80 and trunnion 44. Similar to the embodiments shown in FIGS. 7 & 8, such an alternate configuration as shown in FIG. 9 allows for flexibility in kinematic design as well as enabling variations in part sizing to suit any design or operation requirements.

It will be appreciated that certain aspects of the variable pitch fan 38 are omitted from the exemplary embodiments of FIGS. 2 through 9 for the sake of clarity. For example, the exemplary variable pitch fan 38 configurations provided do not include a primary pitch change mechanism, such as a linear or rotary pitch change mechanism. It will be appreciated, however, that in each of the above configurations, a primary pitch change mechanism may be provided, coupled to the trunnion 44, such as the body 90 of the trunnion 44, through an arm separate from arm 92. As will be appreciated from the description herein, the counterweight assembly 80 may act to change the pitch of the variable pitch fan 38 in the event of a failure of the primary pitch change mechanism (not shown).

Figure 10:
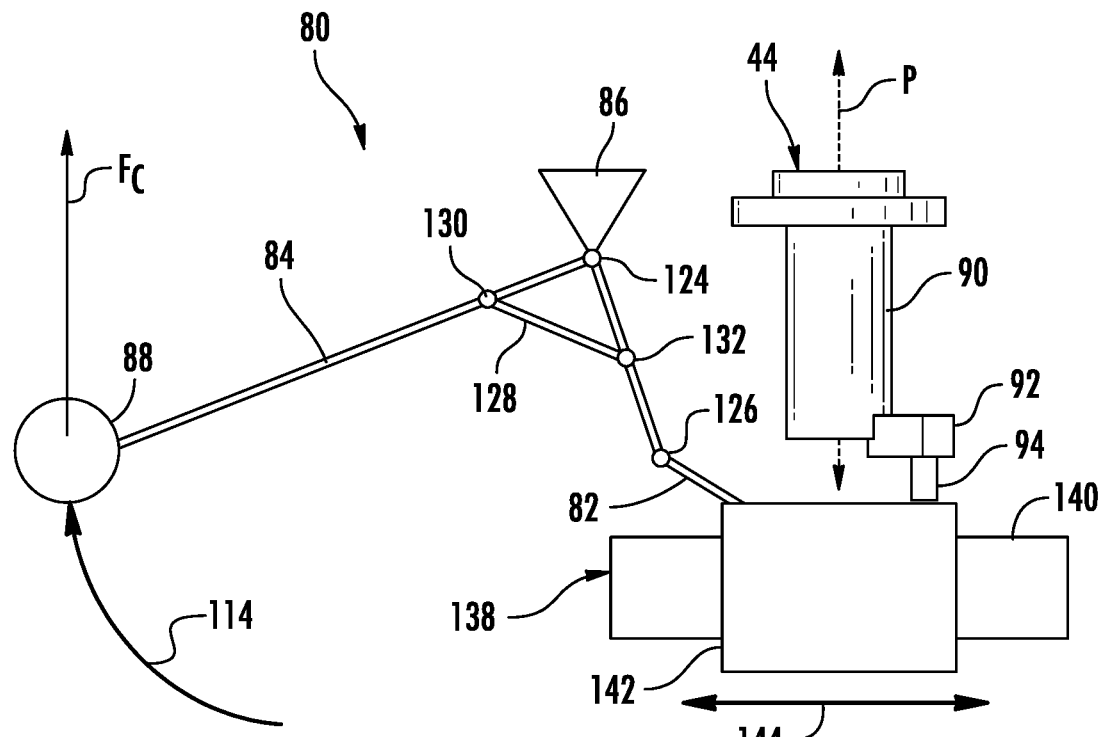
FIG. 10 is a simplified side view of a trunnion and a counterweight assembly attached to a linear actuator.

Referring now to FIG. 10, FIG. 10 is a simplified side view of a trunnion 44 and a counterweight assembly 80 attached to a primary pitch change mechanism, which for the embodiment shown is a linear actuator 138. FIG. 10 shows a pitch axis P, a fan blade 40, a trunnion 44 (with a body 90, an arm 92, and a pin 94), a counterweight assembly 80 (with a link arm 82, a connection point 96, a lever arm 84 (including a first lever portion 98 and a second lever portion 100), a hinge 86, a counterweight 88, a pathway 114 of lever arm 84, a connection point 124, a connection point 126, a truss arm 128, a connection point 130, a connection point 132, a linear actuator 138 (with a first piece 140, a second piece 142, and a translation direction 144), and a force Fc.

Linear actuator 138 is an actuation device configured to create or facilitate motion in a straight line. In some examples, linear actuator 138 can be referred to as a pitch change mechanism. First piece 140 is a stationary component of linear actuator 138. First piece 140 is disposed to remain still relative to disk 42 (see e.g., FIGS. 1-2). In one example, linear actuator 138 can be mounted to disk 42 (shown in FIGS. 2-3). During operation of linear actuator 138, first piece is static relative to second piece 142, to trunnion 44, and to counterweight assembly 80. Second piece 142 is a kinematic or moveable component of linear actuator 138. During operation, second piece 142 moves relative to first piece 140, to trunnion 44, and to counterweight assembly 80. In this example, link arm 82 is configured to drive translation of linear actuator 138. In this example, link arm 82 is configured to drive linear translation of linear actuator 138 such that link arm 82 drives motion or actuation of second piece 142 along translation direction 144. Translation direction 144 is a direction of linear motion of second piece 142 as second piece translates relative to first piece 140. Additionally, pin 94 of trunnion 44 can be rotatably connected to second piece 142 of linear actuator. For example, second piece 142 could include a curved path along which pin 94 travels as second piece 142 translate linearly relative to first piece 140.

In this example, linear actuator 138 is incorporated into the configuration of trunnion 44 and counterweight assembly 80 as shown in FIG. 8 (minus locking mechanism 136). In other examples, linear actuator 138 can be combined with any of the configurations shown in FIGS. 2-9 in order to link counterweight assembly 80 to trunnion 44. Moreover, although for the embodiment shown the primary pitch change mechanism is the linear actuator 138, in other embodiment other pitch change mechanisms may be provided.

Incorporation of linear actuator 138 can provide a benefit of converting force from counterweight assembly 80 into a more predictable or efficient linear motion as the force from link arm 82 that is transferred to trunnion 44 in the form of torque. Moreover, as will be appreciated, having the counterweight assembly 80 couple to the trunnion 44 through the primary pitch change mechanism may open up a variety of additional design options. For example, with such a configuration, the primary pitch change mechanism may effectively act as a unison ring, such that the total number of counterweight assemblies 80 does not need to match the total number of trunnions 44 and fan blades (compare to the embodiment of FIG. 2). With such a configuration, the total number of counterweight assemblies 80 may be less than the total number of trunnions 44 and fan blades, potentially resulting in a less complicated assembly with heavier counterweights, or alternatively the total number of counterweight assemblies 80 may be more than the total number of trunnions 44 and fan blades, potentially resulting in an assembly with smaller counterweights with improved packaging.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A fan assembly for a gas turbine engine includes a fan disk, a trunnion, an actuation device, a fan blade, and a counterweight assembly. The fan disk is configured to rotate about an axial centerline of the gas turbine engine. The trunnion is mounted to the fan disk. The actuation device is operably coupled to the trunnion. The fan blade defines a pitch axis and is rotatably attached to the fan disk about its pitch axis through the trunnion. The counterweight assembly includes a link arm, a lever arm, a hinge, and a counterweight. The link arm is connected to the trunnion, to the actuation device, or to both. The link arm is configured to drive rotation of the trunnion relative to the fan disk. The hinge is pivotably connected to the lever arm. The lever arm is connected to the link arm and is disposed to rotate about a connection point of the lever arm and the hinge. The counterweight is mounted to the lever arm at a location spaced from the hinge.

The fan assembly of one or more of these clauses, wherein the trunnion further comprises: a body; an arm connected to and extending outward along a radial direction from the body; and a pin connected to and extending from the arm, wherein the pin is disposed to rotate relative to the arm.

The fan assembly of one or more of these clauses, wherein the link arm is connected to the arm of the trunnion via the pin of the trunnion.

The fan assembly of one or more of these clauses, wherein the link arm is pivotably connected to the lever arm.

The fan assembly of one or more of these clauses, wherein the hinge connects to the lever arm at an end of the lever arm.

The fan assembly of one or more of these clauses, wherein the hinge connects to the lever arm at a first length from an end of the lever arm, wherein the first length is greater than zero.

The fan assembly of one or more of these clauses, wherein the counterweight is configured to provide an increased force on the trunnion in response to an increased centrifugal load applied to the counterweight during operation of the fan assembly.

The fan assembly of one or more of these clauses, wherein the counterweight assembly defines a translation plane along which the counterweight translates, wherein the translation plane is non-parallel to the pitch axis of the fan blade.

The fan assembly of one or more of these clauses, wherein the counterweight assembly translates along a translation plane that is out of alignment with the pitch axis of the fan blade along an axial direction of the fan disk.

The fan assembly of one or more of these clauses, wherein the counterweight assembly defines a translation plane along which the counterweight translates, wherein the translation plane is parallel to the axial centerline of the gas turbine engine.

The fan assembly of one or more of these clauses, wherein the lever arm comprises a first portion and a second portion, wherein the first portion of the lever arm extends from the connection point of the lever arm at the hinge to a connection point of the link arm at the lever arm, wherein the first portion of the lever arm defines a first length, wherein the second portion of the lever arm extends from the connection point of the link arm at the lever arm to a distal end of the lever arm that is located at an opposite end of the lever arm from the hinge, wherein the second portion of the lever arm defines a second length, wherein the second length is greater than the first length.

The fan assembly of one or more of these clauses, wherein the counterweight assembly is configured to swing the counterweight in response to a centrifugal force experienced by the counterweight.

The fan assembly of one or more of these clauses, wherein the counterweight is configured to swing along an arcuate pathway.

The fan assembly of one or more of these clauses, wherein the link arm is connected to the actuation device.

The fan assembly of one or more of these clauses, wherein the link arm is configured to drive a linear translation of the actuation device.

The fan assembly of one or more of these clauses, wherein the actuation device comprises: a first piece disposed to remain still relative to the fan disk; and a second piece configured to move relative to the first piece, wherein the link arm is configured to drive a linear translation of the second piece in response to a translation of the counterweight.

A counterweight assembly for use in a gas turbine engine includes a link arm, a lever arm, a hinge, and a counterweight. The link arm is configured to couple with a pitch change mechanism of the gas turbine engine, to a trunnion of a fan assembly of the gas turbine engine, or to both. The link arm is configured to drive rotation of the trunnion when coupled to the pitch change mechanism, to the trunnion, or to both. The hinge is pivotably connected to the lever arm. The lever arm is connected to the link arm and is disposed to rotate about a connection point of the lever arm and the hinge. The counterweight is mounted to the lever arm at a location spaced from the hinge. The counterweight is configured to move in response to a change in centrifugal load applied to the counterweight during operation of the gas turbine engine.

The counterweight of one or more of these clauses, wherein the counterweight is configured to swing about an arcuate pathway.

The counterweight of one or more of these clauses, wherein the counterweight assembly defines a translation plane along which the counterweight translates, wherein the translation plane is parallel to a centerline axis of the gas turbine engine.

A gas turbine engine includes a compressor section, a combustion section, a turbine section, and a fan assembly. The combustion section is connected to and is disposed downstream from the compressor section. The turbine section is connected to and is disposed downstream from the combustion section. The compressor section, the combustion section, and the turbine section define a core turbine engine. The fan assembly is connected to and is disposed upstream from the compressor section. The fan assembly includes a fan disk, a trunnion, an actuation device, a fan blade, and a counterweight assembly. The fan disk is configured to rotate about an axial centerline of the gas turbine engine when installed in the gas turbine engine. The trunnion is mounted to the fan disk. The actuation device is operably coupled to the trunnion. The fan blade defines a pitch axis and is rotatably attached to the fan disk about its pitch axis through the trunnion. The counterweight assembly includes a link arm, a lever arm, a hinge, and a counterweight. The link arm is connected to the trunnion, to the actuation device, or to both. The link arm is configured to drive rotation of the trunnion relative to the fan disk. The hinge is pivotably connected to the lever arm. The lever arm connected to the link arm and is disposed to rotate about a connection point of the lever arm and the hinge. The counterweight is mounted to the lever arm at a location spaced from the hinge.

We claim:

1. A fan assembly for a gas turbine engine defining an axial direction and an axial centerline, the fan assembly comprising:
   a fan disk configured to rotate about the axial centerline of the gas turbine engine when installed in the gas turbine engine;
   a trunnion mounted to the fan disk;
   an actuation device operably coupled to the trunnion;
   a fan blade defining a pitch axis and rotatably attached to the fan disk about its pitch axis through the trunnion; and
   a counterweight assembly comprising:
   a link arm connected to the trunnion, the actuation device, or both, wherein the link arm is configured to drive rotation of the trunnion relative to the fan disk;
   a lever arm connected to the link arm;
   a hinge pivotably connected to the lever arm, wherein the lever arm is disposed to rotate about a connection point of the lever arm and the hinge; and
   a counterweight mounted to the lever arm at a location spaced from the hinge;
   wherein the link arm is connected to the actuation device, and wherein the actuation device comprises:
   a first piece disposed to remain still relative to the fan disk; and
   a second piece configured to move relative to the first piece, wherein the link arm is configured to drive a linear translation of the second piece in response to a translation of the counterweight.

2. The fan assembly of claim 1, wherein the trunnion further comprises:
   a body;
   an arm connected to and extending outward along a radial direction from the body; and
   a pin connected to and extending from the arm, wherein the pin is disposed to rotate relative to the arm.

3. The fan assembly of claim 2, wherein the link arm is connected to the arm of the trunnion via the pin of the trunnion.

4. The fan assembly of claim 1, wherein the link arm is pivotably connected to the lever arm.

5. The fan assembly of claim 1, wherein the hinge connects to the lever arm at an end of the lever arm.

6. The fan assembly of claim 1, wherein the hinge connects to the lever arm at a first length from an end of the lever arm, wherein the first length is greater than zero.

7. The fan assembly of claim 1, wherein the counterweight is configured to provide an increased force on the trunnion in response to an increased centrifugal load applied to the counterweight during operation of the fan assembly.

8. The fan assembly of claim 1, wherein the counterweight assembly defines a translation plane along which the counterweight translates, wherein the translation plane is non-parallel to the pitch axis of the fan blade.

9. The fan assembly of claim 1, wherein the counterweight assembly translates along a translation plane that is out of alignment with the pitch axis of the fan blade along an axial direction of the fan disk.

10. The fan assembly of claim 1, wherein the counterweight assembly defines a translation plane along which the counterweight translates, wherein the translation plane is parallel to the axial centerline of the gas turbine engine.

11. The fan assembly of claim 1, wherein the lever arm comprises a first portion and a second portion, wherein the first portion of the lever arm extends from the connection point of the lever arm at the hinge to a connection point of the link arm at the lever arm, wherein the first portion of the lever arm defines a first length, wherein the second portion of the lever arm extends from the connection point of the link arm at the lever arm to a distal end of the lever arm that is located at an opposite end of the lever arm from the hinge, wherein the second portion of the lever arm defines a second length, wherein the second length is greater than the first length.

12. The fan assembly of claim 1, wherein the counterweight assembly is configured to swing the counterweight in response to a centrifugal force experienced by the counterweight.

13. The fan assembly of claim 12, wherein the counterweight is configured to swing along an arcuate pathway.

14. The fan assembly of claim 1, wherein the link arm is configured to drive a linear translation of the actuation device.

15. A counterweight assembly for use in a gas turbine engine, the counterweight assembly comprising:
- a link arm configured to couple with a pitch change mechanism of the gas turbine engine, a trunnion of a fan assembly of the gas turbine engine, or both, wherein the link arm is configured to drive rotation of the trunnion when coupled to the pitch change mechanism, the trunnion, or both;
- a lever arm connected to the link arm;
- a hinge pivotably connected to the lever arm, wherein the lever arm is disposed to rotate about a connection point of the lever arm and the hinge; and
- a counterweight mounted to the lever arm at a location spaced from the hinge, wherein the counterweight is configured to move in response to a change in centrifugal load applied to the counterweight during operation of the gas turbine engine, wherein the link arm is connected to the actuation device, and wherein the actuation device comprises:
- a first piece disposed to remain still relative to the fan disk; and
- a second piece configured to move relative to the first piece, wherein the link arm is configured to drive a linear translation of the second piece in response to a translation of the counterweight.

16. The counterweight assembly of claim 15, wherein the counterweight is configured to swing about an arcuate pathway.

17. The counterweight assembly of claim 15, wherein the counterweight assembly defines a translation plane along which the counterweight translates, wherein the translation plane is parallel to a centerline axis of the gas turbine engine.

18. A gas turbine engine defining an axial direction, the gas turbine engine comprising:
- a compressor section;
- a combustion section connected to and disposed downstream from the compressor section;
- a turbine section connected to and disposed downstream from the combustion section, wherein the compressor section, the combustion section, and the turbine section define a core turbine engine; and
- a fan assembly connected to and disposed upstream from the compressor section, wherein the fan assembly comprises:
- a fan disk configured to rotate about the axial centerline of the gas turbine engine when installed in the gas turbine engine;
- a trunnion mounted to the fan disk;
- an actuation device operably coupled to the trunnion;
- a fan blade defining a pitch axis and rotatably attached to the fan disk about its pitch axis through the trunnion; and
- a counterweight assembly comprising:
- a link arm connected to the trunnion, the actuation device, or both, wherein the link arm is configured to drive rotation of the trunnion relative to the fan disk;
- a lever arm connected to the link arm;
- a hinge pivotably connected to the lever arm, wherein the lever arm is disposed to rotate about a connection point of the lever arm and the hinge; and
- a counterweight mounted to the lever arm at a location spaced from the hinge, wherein the link arm is connected to the actuation device, and wherein the actuation device comprises:
- a first piece disposed to remain still relative to the fan disk; and
- a second piece configured to move relative to the first piece, wherein the link arm is configured to drive a linear translation of the second piece in response to a translation of the counterweight.

* * * * *